United States Patent
Goto et al.

(10) Patent No.: US 10,850,718 B2
(45) Date of Patent: Dec. 1, 2020

(54) ELECTRIC BRAKE APPARATUS

(71) Applicant: HITACHI AUTOMOTIVE SYSTEMS, LTD., Ibaraki (JP)

(72) Inventors: Daisuke Goto, Atsugi (JP); Takuya Usui, Yokohama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 82 days.

(21) Appl. No.: 16/313,588

(22) PCT Filed: May 26, 2017

(86) PCT No.: PCT/JP2017/019678
§ 371 (c)(1),
(2) Date: Dec. 27, 2018

(87) PCT Pub. No.: WO2018/003365
PCT Pub. Date: Jan. 4, 2018

(65) Prior Publication Data
US 2019/0315322 A1  Oct. 17, 2019

(30) Foreign Application Priority Data
Jun. 28, 2016 (JP) .................. 2016-128090

(51) Int. Cl.
*B60T 13/74* (2006.01)
*B60T 8/17* (2006.01)
(Continued)

(52) U.S. Cl.
CPC ............... *B60T 8/17* (2013.01); *B60T 7/042* (2013.01); *B60T 7/12* (2013.01); *B60T 8/171* (2013.01);
(Continued)

(58) Field of Classification Search
CPC .......... B60T 8/17; B60T 8/172; B60T 8/4081; B60T 13/662; B60T 13/745
(Continued)

(56) References Cited

U.S. PATENT DOCUMENTS 9,010,107 B2 * 4/2015 Yamada ................ B60T 13/745
60/545
9,604,618 B2 * 3/2017 Mahnkopf ................ B60T 1/10
(Continued)

FOREIGN PATENT DOCUMENTS

JP           2012-96626       5/2012
WO      WO2012/118103    9/2012

OTHER PUBLICATIONS

International Search Report dated Aug. 22, 2017 in International (PCT) Application No. PCT/JP2017/019678.

*Primary Examiner* — Christopher P Schwartz
(74) *Attorney, Agent, or Firm* — Wenderoth, Lind & Ponack, L.L.P.

(57) ABSTRACT

An electric brake apparatus includes an electronic control unit (ECU) configured to move a power piston to cause a braking hydraulic pressure to be generated in a master cylinder by controlling an electric motor of an electric actuator based on an operation on a brake pedal (an input member position). A characteristic update processing portion of the ECU is configured to update, based on an operation amount of the brake pedal, characteristic data indicating a relationship between a hydraulic value transmitted from the ECU via a vehicle data bus and a movement amount of the power piston controlled based on the input member position, and store the updated characteristic data. The ECU is configured to control the electric actuator based on the updated characteristic data when an automatic brake instruction is input.

6 Claims, 6 Drawing Sheets

(51) Int. Cl.
  *B60T 7/04*     (2006.01)
  *B60T 7/12*     (2006.01)
  *B60T 8/171*    (2006.01)
  *B60T 8/172*    (2006.01)
  *B60T 8/40*     (2006.01)
  *B60T 13/66*    (2006.01)
  *B60T 7/22*     (2006.01)

(52) U.S. Cl.
  CPC ............ *B60T 8/172* (2013.01); *B60T 8/4081* (2013.01); *B60T 13/66* (2013.01); *B60T 13/745* (2013.01); *B60T 7/22* (2013.01); *B60T 2201/06* (2013.01); *B60T 2270/10* (2013.01); *B60T 2270/20* (2013.01); *B60T 2270/30* (2013.01); *B60T 2270/82* (2013.01)

(58) Field of Classification Search
  USPC .......... 60/534, 545; 303/3, 7, 15, 20, 114.1; 701/70–72
  See application file for complete search history.

(56)              References Cited

U.S. PATENT DOCUMENTS

| | | | |
|---|---|---|---|
| 9,663,088 B2 * | 5/2017 | Takayama | B60T 13/745 |
| 2012/0102941 A1 | 5/2012 | Yamada et al. | |
| 2013/0197771 A1 * | 8/2013 | Takeda | B60T 13/745 |
| | | | 701/70 |

* cited by examiner

ELECTRIC BRAKE APPARATUS

CROSS-REFERENCE TO RELATED APPLICATION

The present application claims priority to Japanese Patent Application No. 2016-128090 filed on Jun. 28, 2016. The entire disclosure of Japanese Patent Application No. 2016-128090 including the specification, the claims, the drawings, and the abstract is incorporated herein by reference in its entirety.

TECHNICAL FIELD

The present invention relates to an electric brake apparatus that applies a braking force to a vehicle such as an automobile.

BACKGROUND ART

As an electric brake apparatus mounted on a vehicle such as an automobile, there is known a configuration that applies a braking hydraulic pressure (a brake hydraulic pressure) to a wheel brake mechanism of the vehicle by an electric actuator (WO 2012/118103). Then, the electric brake apparatus discussed in WO 2012/118103 sets a target hydraulic pressure of a master cylinder according to an operation amount of a brake pedal, and controls the electric actuator in such a manner that a master cylinder hydraulic pressure detected by a hydraulic sensor matches the target hydraulic pressure.

The electric brake apparatus discussed in WO 2012/118103 updates, when the hydraulic sensor normally works, a brake characteristic indicating a relationship between a movement amount of a piston in the master cylinder (a motor rotational position) and a generated hydraulic pressure (the master cylinder hydraulic pressure) while the electric actuator is in operation. Then, when the hydraulic sensor works abnormally, this electric brake apparatus calculates a movement of the piston corresponding to the target hydraulic pressure of the master cylinder with use of the updated brake characteristic, and controls the electric actuator so as to achieve this calculated movement amount. By this control, even when an abnormality has occurred in the hydraulic sensor, the electric brake apparatus can apply a braking force according to hydraulic stiffness before the abnormality has occurred.

SUMMARY OF INVENTION

Technical Problem

However, in the case where the electric actuator is controlled with use of the brake characteristic indicating the relationship between the movement amount of the piston and the generated hydraulic pressure, an actually generated braking hydraulic pressure may deviate from a desired braking hydraulic pressure (a braking hydraulic pressure corresponding to a braking instruction desired to be satisfied) if, for example, the brake characteristic is updated with direct use of the detected movement amount of the piston and the detected generated hydraulic pressure.

An object of the present invention is to provide an electric brake apparatus capable of accurately generating the desired braking hydraulic pressure.

Solution to Problem

To achieve the above-described object, according to the present invention, an electric brake apparatus includes an electric actuator configured to be activated so as to generate a braking hydraulic pressure in a master cylinder of a vehicle, an operation amount detector configured to detect an operation amount of a brake pedal of the vehicle, a piston configured to be moved due to the activation of the electric actuator, a movement amount detector configured to detect a movement amount of the piston, and a controller configured to control the electric actuator to move the piston based on a first braking instruction value based on an operation on the brake pedal or a second braking instruction value input from an inter-apparatus communication network of the vehicle. The controller is configured to control the electric actuator based on the first braking instruction value to move the piston to thereby generate a braking hydraulic pressure when the first braking instruction value is input; correct, based on the operation amount of the brake pedal, characteristic data indicating a relationship between the braking hydraulic value in the master cylinder input from the inter-apparatus communication network and the movement amount of the piston controlled based on the first braking instruction value, and store the corrected characteristic data while the braking hydraulic pressure is generated; and control the electric actuator based on the corrected characteristic data when the second braking instruction value is input.

The present electric brake apparatus can accurately generate the desired braking hydraulic pressure.

BRIEF DESCRIPTION OF DRAWINGS

FIG. 3 is a block diagram illustrating the electric brake apparatus, a master cylinder, a wheel brake mechanism, and the like.

DESCRIPTION OF EMBODIMENTS

In the following description, an electronic brake apparatus according to an embodiment will be described in detail with reference to the accompanying drawings based on an example in which this electronic brake apparatus is mounted on a four-wheeled automobile.

Figure 1:
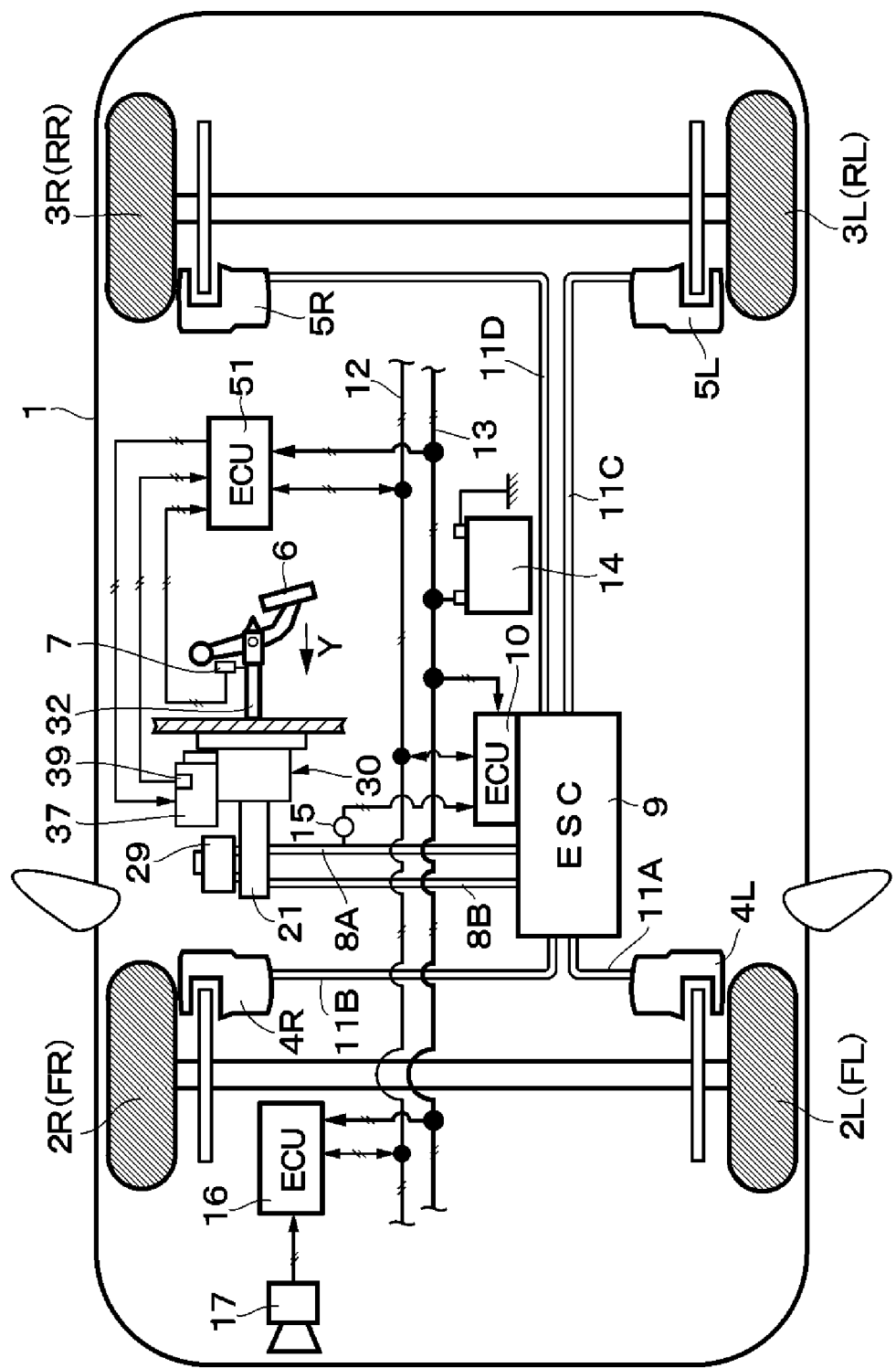
FIG. 1 schematically illustrates a vehicle on which an electric brake apparatus according to an embodiment is mounted.

In FIG. 1, four wheels in total that include front left and right wheels 2L and 2R and rear left and right wheels 3L and 3R are mounted under (on a road surface side of) a vehicle body 1 forming a body of a vehicle. The wheels (each of the front wheels 2L and 2R and each of the rear wheels 3L and 3R) form the vehicle together with the vehicle body 1. Front wheel-side wheel cylinders 4L and 4R are provided for the front left and right wheels 2L and 2R, respectively. Rear wheel-side wheel cylinders 5L and 5R are provided for the rear left and right wheels 3L and 3R, respectively. Each of these wheel cylinders 4L, 4R, 5L, and 5R serve as a wheel brake mechanism (a frictional brake mechanism) that applies a braking force (a frictional braking force) to the respective wheels 2L, 2R, 3L, and 3R. Each of the wheel cylinders 4L, 4R, 5L, and 5R is constructed with use of, for example, a hydraulic disk brake or a drum brake.

A brake pedal 6 is provided on a dash board side of the vehicle body 1. The brake pedal 6 is operated by being pressed in a Y direction indicated by an arrow by an occupant (a person sitting in the vehicle), more specifically, a driver when a brake operation is performed on the vehicle, and each of the wheel cylinders 4L, 4R, 5L and 5R applies the braking force to the wheel 2L, 2R, 3L, or 3R based on this operation. Then, a brake operation sensor 7 is provided for the brake pedal 6 (more specifically, an input member 32 of an electric booster 30, which will be described below). The brake operation sensor 7 functions as an operation amount detector that detects an operation amount of the brake pedal 6 (a brake pedal operation amount) that is input by the driver.

The brake operation sensor 7 can be embodied by, for example, a stroke sensor (a displacement sensor) that detects a stroke amount (a pedal stroke) corresponding to a displacement amount of the brake pedal 6 (the input member 32). The brake operation sensor 7 is not limited to the stroke sensor, and can be embodied by various kinds of sensors capable of detecting the operation amount (a pressing amount) of the brake pedal 6 (the input member 32), such as a force sensor that detects a pedal pressing force (a load sensor), and an angle sensor that detects a rotational angle (a tilt) of the brake pedal 6. In this case, the brake operation sensor 7 may be constructed with use of one (one kind of) sensor or may be constructed with use of a plurality of (a plurality of kinds of) sensors.

A detection signal of the brake operation sensor 7 (a brake pedal operation amount) is output to an electric booster ECU 51 (hereinafter referred to as an ECU 51), which will be described below. The ECU 51 forms the electric booster 30, which will be described below, together with the brake operation sensor 7 and the like. As will be described below, the ECU 51 outputs a driving signal to an electric motor 37 of the electric booster 30 based on the brake pedal operation amount (a first braking instruction value) as the detection signal detected by the brake operation sensor 7, thereby causing a hydraulic pressure (a braking hydraulic pressure) to be generated in hydraulic chambers 25 and 26 (refer to FIG. 2) in a master cylinder 21 attached to the electric booster 30. Further, the ECU 51, for example, also causes the hydraulic pressure to be generated in the master cylinder 21 when receiving an automatic brake instruction (a second braking instruction value) via a vehicle data bus 12, which will be described below.

At this time, the ECU 51 can output the driving signal to the electric motor 37 of the electric booster 30 based on the automatic brake instruction to cause the hydraulic pressure to be generated in the hydraulic chambers 25 and 26 in the master cylinder 21, independently of the operation performed on the brake pedal 6 by the driver. The hydraulic pressure generated in the master cylinder 21 is supplied to each of the wheel cylinders 4L, 4R, 5L, and 5R via a hydraulic pressure supply apparatus 9, and the braking force is applied to each of the wheels 2L, 2R, 3L, and 3R. Configurations of the master cylinder 21, a reservoir 29, the electric booster 30, and the like illustrated in FIGS. 2 to 4 will be described in detail below.

As illustrated in FIG. 1, the hydraulic pressure generated in the master cylinder 21 is supplied to the hydraulic pressure supply apparatus 9 (hereinafter referred to as an ESC 9) via a pair of cylinder-side hydraulic pipes 8A and 8B. The ESC 9 is provided between the master cylinder 21 and the wheel cylinders 4L, 4R, 5L, and 5R. The ESC 9 distributes and supplies the hydraulic pressure output from the master cylinder 21 via the cylinder-side hydraulic pipes 8A and 8B to the wheel cylinders 4L, 4R, 5L, and 5R via brake-side pipe portions 11A, 11B, 11C, and 11D, respectively. The ESC 9 includes, for example, a plurality of control valves, a hydraulic pump, an electric motor, and a hydraulic control reservoir (all of them are not illustrated). The hydraulic pump increases a pressure of the brake fluid. The electric motor drives this hydraulic pump. The hydraulic control reservoir temporarily stores extra brake fluid therein. Opening/closing of each of the control valves and driving of the electric motor of the ESC 9 are controlled by a hydraulic pressure supply apparatus ECU 10 (hereinafter referred to as an ECU 10).

The ECU 10, which corresponds to a first ECU, includes, for example, a microcomputer. The ECU 10 is a hydraulic pressure supply apparatus control unit that electrically controls driving of the ESC 9 (each of the control valves and the electric motor thereof). An input side of the ECU 10 is connected to the vehicle data bus 12 and a hydraulic sensor 15. An output side of the ECU 10 is connected to each of the control valves, the electric motor, and the vehicle data bus 12.

The ECU 10 controls the driving of each of the control valves, the electric motor, and the like of the ESC 9 individually. By this control, the ECU 10 performs control of reducing, maintaining, increasing, or pressurizing the braking hydraulic pressures (the brake hydraulic pressures) to be supplied from the brake-side pipe portions 11A, 11B, 11C, and 11D to the wheel cylinders 4L, 4R, 5L, and 5R, respectively, for each of the wheel cylinders 4L, 4R, 5L, and 5R individually.

In this case, the ECU 10 can perform, for example, the following kinds of control (1) to (8) by controlling actuation of the ESC 9.

(1) braking force distribution control of appropriately distributing the braking force to each of the wheels 2L, 2R, 3L, and 3R according to a vertical load and the like when the vehicle is braked (2) anti-lock brake control of preventing each of the wheels 2L, 2R, 3L, and 3R from being locked (slipped) by automatically adjusting the braking force provided to each of the wheels 2L, 2R, 3L, and 3R when the vehicle is braked (3) vehicle stabilization control of stabilizing a behavior of the vehicle, by preventing or reducing understeer and oversteer while detecting a sideslip of each of the wheels 2L, 2R, 3L, and 3R when the vehicle is running to thus appropriately automatically control the braking force to be applied to each of the wheels 2L, 2R, 3L, and 3R regardless of the operation amount of the brake pedal 6

(4) hill start aid control of aiding a start by maintaining a braked state on a slope (5) traction control of preventing each of the wheels 2L, 2R, 3L, and 3R from idly spinning, for example, when the vehicle starts running (6) adaptive cruise control of maintaining a predetermined distance to a vehicle running ahead (7) traffic lane departure avoidance control of maintaining the vehicle within a traffic lane (8) obstacle avoidance control of avoiding a collision with an obstacle in front of or behind the vehicle The ESC 9 directly supplies the hydraulic pressure generated in the master cylinder 21 to the wheel cylinders 4L, 4R, 5L, and 5R at the time of a normal operation in response to the brake operation performed by the driver. On the other hand, for example, the ESC 9 maintains the hydraulic pressures in the wheel cylinders 4L, 4R, 5L and 5R by closing a control valve for the pressure increase when performing the anti-lock brake control or the like, and discharges the hydraulic pressures in the wheel cylinders 4L, 4R, 5L, and 5R so as to release them to the hydraulic control reservoir by opening a control valve for the pressure reduction when reducing the hydraulic pressures in the wheel cylinders 4L, 4R, 5L, and 5R.

Further, the ESC 9 actuates the hydraulic pump by the electric motor with a control valve for the supply closed, thereby supplying the brake fluid discharged from this hydraulic pump to the wheel cylinders 4L, 4R, 5L, and 5R when increasing or pressurizing the hydraulic pressures to be supplied to the wheel cylinders 4L, 4R, 5L, and 5R to perform, for example, the stabilization control (electronic stability control) when the vehicle is running. At this time, the brake fluid in the reservoir 29 is supplied from the master cylinder 21 side toward an intake side of the hydraulic pump. This control valve for the supply is a valve different from the above-described control valve for the pressure increase or control valve for the pressure reduction.

The vehicle data bus 12 is a communication network between vehicle ECUs called a V-CAN that is mounted on the vehicle. More specifically, the vehicle data bus 12 is a serial communication portion that establishes multiplex communication among a large number of electric apparatuses (for example, among the ECU 10, the ECU 16, and the ECU 51) mounted on the vehicle. Power is supplied from an in-vehicle battery 14 to the ECU 10 via a power line 13. Power is also supplied from the in-vehicle battery 14 to the ECU 16 and the ECU 51, which will be described below, via the power line 13. In FIG. 1, a line with two slash marks added thereto indicates an electricity-related line such as a signal line and a power source line.

The hydraulic sensor 15 is provided in the cylinder-side hydraulic pipe 8A between the master cylinder 21 (the first hydraulic chamber 25 thereof) and the ECU 9. The hydraulic sensor 15 detects the pressure (the brake hydraulic pressure) generated in the master cylinder 21, more specifically, a hydraulic pressure in the cylinder-side hydraulic pipe 8A. The hydraulic sensor 15 is electrically connected to the ECU 10 of the ESC 9. A detection signal of the hydraulic sensor 15 (a hydraulic value) is output to the ECU 10. The ECU 10 outputs the hydraulic value detected by the hydraulic sensor 15 to the vehicle data bus 12. The electric booster ECU 51, which will be described below, can recognize (acquire) the hydraulic value in the master cylinder 21 by receiving the hydraulic value from the ECU 10.

The ECU 10 and the ECU 51 may be connected to each other via a communication line (a signal line) provided separately from the vehicle data bus 12, such as a communication line called an L-CAN capable of establishing communication between in-vehicle ECUs (the communication network between vehicle ECUs), and configured to transmit and receive the hydraulic value of the hydraulic sensor 15 via this communication line. In other words, the electric booster ECU 51 acquires the hydraulic value detected by the hydraulic sensor 15 from the ECU 10 via the communication network between vehicle ECUs (the vehicle data bus 12 or the communication line).

An automatic brake ECU 16 (hereinafter referred to as an ECU 16) is connected to the vehicle data bus 12. The ECU 16, which corresponds to a second ECU, is an automatic brake control unit that outputs an automatic brake instruction (an automatic brake braking instruction value). The ECU 16 also includes a microcomputer similarly to the ECU 10 and the ECU 51, which will be described below, and is connected to the ECUs 10 and 51 and the like via the vehicle data bus 12.

Now, the ECU 16 is connected to, for example, an eternal world recognition sensor 17. The external world recognition sensor 17 forms an object position measurement device that measures a position of an object located around the vehicle, and can be embodied by a camera such as a stereo camera and a single camera (for example, a digital camera), and/or a radar such as a laser radar, an infrared radar, and a millimeter-wave radar (for example, a light emitting element such as a semiconductor radar and a light receiving element that receives it). The external world recognition sensor 17 is not limited to the camera and the radar, and may be embodied by various kinds of sensors (a detector, a meter, and a radiodetector) capable of recognizing (detecting) a state of the external world, which is a neighborhood around the vehicle.

The ECU 16 calculates, for example, a distance to an object located in front of the vehicle based on a result (information) of the detection by the external world recognition sensor 17, and also calculates the automatic brake braking instruction value corresponding to the braking force (the braking hydraulic pressure) to be applied based on this distance, a current running speed of the vehicle, and the like. The calculated automatic brake braking instruction value is output from the ECU 16 to the vehicle data bus 12 as the automatic brake instruction.

In this case, for example, upon acquiring the automatic brake braking instruction value (a second braking instruction value) via the vehicle data bus 12, the electric booster ECU 51, which corresponds to a third ECU, drives the electric motor 37 of the electric booster 30 based on this acquired automatic brake braking instruction value. In other words, the electric booster 30 can apply the braking force (the automatic brake) to each of the wheels 2L, 2R, 3L, and 3R by causing the hydraulic pressure to be generated in the master cylinder 21 to increase the pressure in each of the wheel cylinders 4L, 4R, 5L, and 5R based on the automatic brake braking instruction value.

Next, the master cylinder 21, the reservoir 29, and the electric booster 30 will be described with additional reference to FIG. 2, along with FIG. 1.

The master cylinder 21 is actuated by the brake operation performed by the driver. The master cylinder 21 supplies the braking hydraulic pressure to the wheel cylinders 4L, 4R, 5L, and 5R, which apply the braking force to the vehicle. As illustrated in FIG. 2, the master cylinder 21 includes a tandem-type master cylinder. More specifically, the master cylinder 21 includes a cylinder main body 22, a primary piston 23, a secondary piston 24, the first hydraulic chamber 25, the second hydraulic chamber 26, a first return spring 27, and a second return spring 28.

Figure 2:
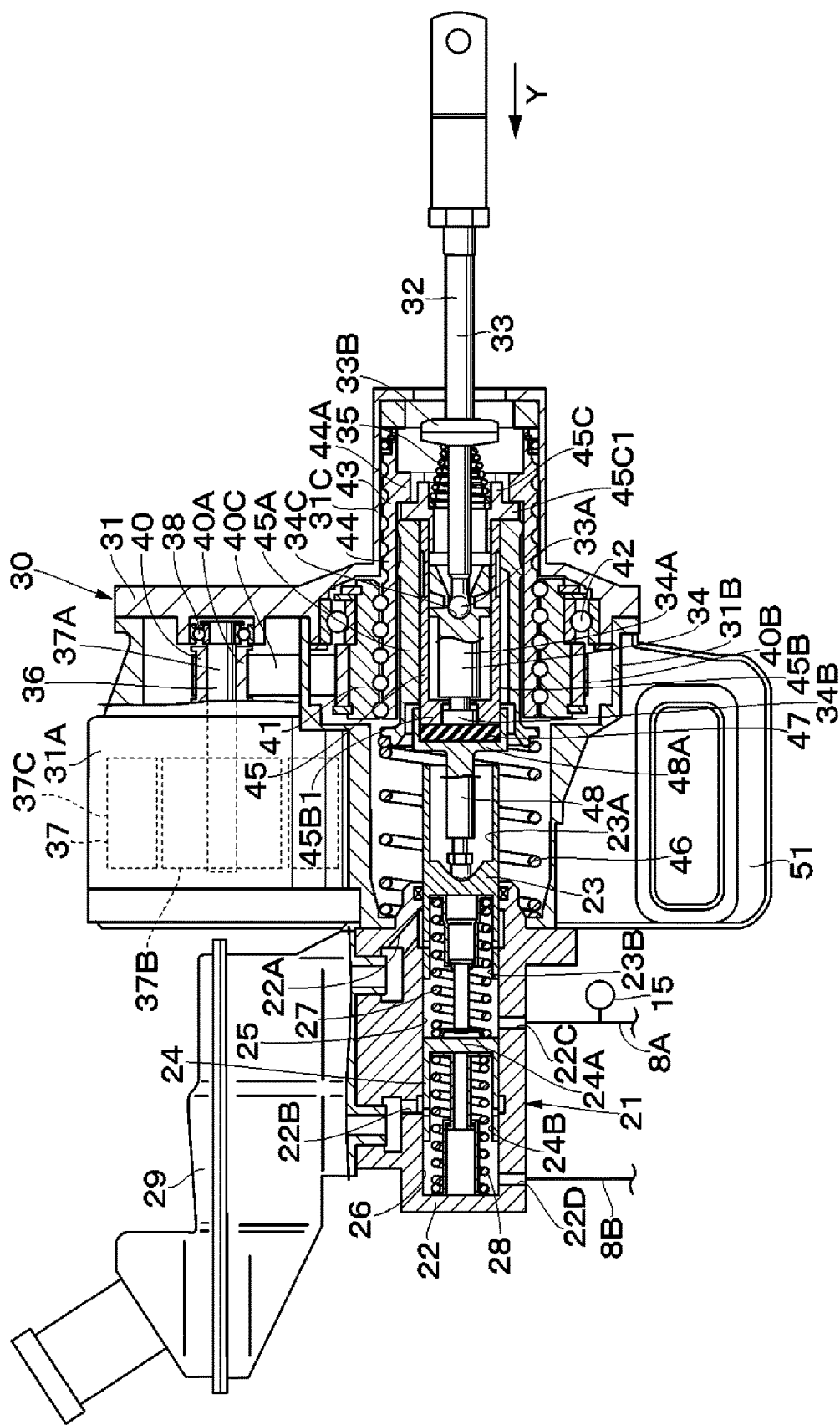
FIG. 2 is a cross-sectional view illustrating the electric brake apparatus according to the embodiment.

The cylinder main body 22 is formed into a bottomed cylindrical shape having an opened end on one side thereof (for example, a right side in a left-right direction in FIG. 2 and a rear side in a longitudinal direction of the vehicle) and a bottom portion closed on the other side thereof (for example, a left side in the left-right direction in FIG. 2 and a front side in the longitudinal direction of the vehicle) in an axial direction (the left-right direction in FIG. 2). The cylinder main body 22 is attached at the opening end side thereof to a booster housing 31 of the electric booster 30, which will be described below. First and second reservoir ports 22A and 22B connected to the reservoir 29 are provided on the cylinder main body 22. Further, first and second supply ports 22C and 22D are provided on the cylinder main body 22. The first and second supply ports 22C and 22D are connected to the wheel cylinders 4L, 4R, 5L, and 5R via the cylinder-side hydraulic pipes 8A and 8B, and the like.

The primary piston 23 includes a bottomed rod insertion hole 23A on one axial side thereof and a bottomed spring containing hole 23B on the other axial side thereof. The spring containing hole 23B is opened to an opposite side from the rod insertion hole 23A (opened to the other side), and one side of the first return spring 27 is disposed in the spring containing hole 23B. The rod insertion hole 23A side of the primary piston 23 protrudes outward from the opening end side of the cylinder main body 22, and an output rod 48, which will be described below, is inserted in the rod insertion hole 23A in an abutting state.

The secondary piston 24 is formed into a bottomed cylindrical shape, and is closed at a bottom portion 24A formed on one axial side thereof that faces the primary piston 23. A spring containing hole 24B, which is opened to the other axial side, is formed at the secondary piston 24, and one side of the second return spring 28 is disposed in the spring containing hole 24B.

The first hydraulic chamber 25 is defined in the cylinder main body 22 between the primary piston 23 and the secondary piston 24. The second hydraulic chamber 26 is defined in the cylinder main body 22 between the secondary piston 24 and a bottom portion of the cylinder main body 22.

The first return spring 27 is positioned in the first hydraulic chamber 25, and is arranged between the primary piston 23 and the secondary piston 24. The first return spring 27 biases the primary piston 23 toward the opening end side of the cylinder main body 22. The second return spring 28 is positioned in the second hydraulic chamber 26, and is arranged between the bottom portion of the cylinder main body 22 and the secondary piston 24. The second return spring 28 biases the secondary piston 24 toward the first hydraulic chamber 25 side.

For example, when the brake pedal 6 is operated by being pressed, the primary piston 23 and the secondary piston 24 are displaced toward the bottom portion side of the cylinder main body 22 in the cylinder main body 22 of the master cylinder 21. At this time, when the first and second reservoir pots 22A and 22B are blocked by the primary piston 23 and the secondary piston 24, respectively, the brake hydraulic pressure (an M/C pressure) is generated from the master cylinder 21 by the brake fluid in the first and second hydraulic chambers 25 and 26. On the other hand, when the operation on the brake pedal 6 is released, the primary piston 23 and the secondary piston 24 are displaced toward the opening portion side of the cylinder main body 22 by the first and second return springs 27 and 28, respectively.

The reservoir 29 is attached to the cylinder main body 22 of the master cylinder 21. The reservoir 29 is configured as a hydraulic oil tank that sores the brake fluid therein, and replenishes (supplies and discharges) the brake fluid into the hydraulic chambers 25 and 26 in the cylinder main body 22. As illustrated in FIG. 2, when the first reservoir port 22A is in communication with the first hydraulic chamber 25 and the second reservoir port 22B is in communication with the second hydraulic chamber 26, the brake fluid can be supplied or discharged between the reservoir 29 and the hydraulic chambers 25 and 26.

On the other hand, when the first reservoir port 22A is disconnected from the first hydraulic chamber 25 by the primary piston 23 and the second reservoir port 22B is disconnected from the second hydraulic chamber 26 by the secondary piston 24, the supply and the discharge of the brake fluid are stopped between the reservoir 29 and the hydraulic chambers 25 and 26. In this case, the brake hydraulic pressure (M/C pressure) is generated in the hydraulic chambers 25 and 26 of the master cylinder 21 according to the displacements of the primary piston 23 and the secondary piston 24, and this brake hydraulic pressure is supplied to the ESC 9 via the pair of cylinder-side hydraulic pipes 8A and 8B.

The electric booster 30 as the electric brake apparatus is provided between the brake pedal 6 and the master cylinder 21. The electric booster 30 serves as a boosting mechanism (a booster) that transmits the brake operation force (the pressing force) to the master cylinder 21 while powering up this force by driving the electric motor 37 according to the brake pedal operation amount (the pressing amount), which corresponds to the first braking instruction value, when the operation of pressing the brake pedal 6 is performed by the driver. In addition thereto, the electric booster 30 serves as an automatic brake application mechanism that automatically applies the braking force (the automatic brake) even without the brake operation (the pedal operation) performed by the driver.

In other words, the electric booster 30 causes the brake hydraulic pressure to be generated in the master cylinder 21 by driving the electric motor 37 according to the automatic brake instruction, which corresponds to the second braking instruction value (for example, from the ECU 16). Due to this configuration, the electric booster 30 can supply the brake hydraulic pressure into each of the wheel cylinders 4L, 4R, 5L, and 5R regardless of the brake operation by the driver (regardless of whether the operation is present or absent), thereby automatically applying the braking force (the automatic brake).

The electric booster 30 includes the brake operation sensor 7 (FIGS. 1 and 3) as an operation amount detector, an electric actuator 36, an angle sensor 39 (FIGS. 1 and 3) as a movement amount detector, a power piston 45 as a piston, and the ECU 51 as a controller. More specifically, the electric booster 30 includes the brake operation sensor 7, the booster housing 31, the input member 32, the electric actuator 36, the angle sensor 39, the power piston 45, a reaction disk 47, an output rod 48, the ECU 51, and the like.

The booster housing 31 forms an outer shell of the electric booster 30, and is fixed to, for example, a front wall of a vehicle compartment, which is the dash board of the vehicle body. The booster housing 31 includes a motor case 31A, an output case 31B, and an input case 31C. The motor case 31A contains therein the electric motor 37 and a part (a driving pulley 40A side) of a speed reduction mechanism 40, which will be described below. The output case 31B contains therein the other portion (a driven pulley 40B side) of the speed reduction mechanism 40, a part (the other axial side) each of a rotation-linear motion convention mechanism 43 and the power piston 45, the reaction disk 47, the output rod 48, the second return spring 46, and the like. The input case 31C closes openings of the motor case 31A and the output case 31B on one axial side, and also contains therein the other portion (one axial side) each of the rotation-linear motion conversion mechanism 43 and the power piston 45, an intermediate portion of the input member 32, and the like.

The input member 32 is provided axially movably relative to the booster housing 31, and is connected to the brake pedal 6. The input member 32 includes a rod member 33 and a piston member 34. The rod member 33 and the piston member 34 are inserted through inside the rotation-linear motion conversion mechanism 43 and the power piston 45 in a concentrically connected state. In this case, one axial side of the rod member 33 protrudes from the input case 31C of the booster housing 31. Then, the brake pedal 6 is coupled to the one side of the rod member 33 that corresponds to a protrusion end.

On the other hand, the other axial side of the rod member 33 includes a spherical portion 33A formed on a distal end thereof, and this spherical portion 33A is inserted in the power piston 45. A flange portion 33B is provided at an intermediate portion of the rod member 33. The flange portion 33B protrudes radially outward along an entire circumference. A first return spring 35 is provided between the flange portion 33B and the power piston 45. The first return spring 35 constantly biases the input member 32 (the rod member 33) relative to the power piston 45 toward the one axial side.

The piston member 34 is fittedly inserted in the power piston 45 axially movably (slidably) relative to the power piston 45. The piston member 34 includes a main body portion 34A and a pressure reception portion 34B. The main body portion 34A is provided so as to face the rod member 33. The pressure reception portion 34B is provided so as to protrude from the main body portion 34A toward the other axial direction. A recessed portion 34C is provided on one axial side of the main body portion 34A at a position corresponding to the spherical portion 33A of the rod member 33. The spherical portion 33A of the rod member 33 is fixedly attached in the recessed portion 34C with use of a method such as swaging.

On the other hand, a distal end surface of the pressure reception portion 34B serves as an abutment surface that abuts the reaction disk 47. For example, when the brake pedal 6 is not operated, a predetermined space is formed between the distal end surface of the pressure reception portion 34B and the reaction disk 47. When the brake pedal 6 is operated by being pressed, the distal end surface of the pressure reception portion 34B and the reaction disk 47 are brought into abutment with each other, and a thrust force of the input member 32 (the pressing force) is applied to the reaction disk 47.

The electric actuator 36 is activated so as to generate the braking hydraulic pressure in the master cylinder 21 of the vehicle (so as to apply the braking hydraulic pressure to each of the wheel cylinders 4L, 4R, 5L, and 5R of the vehicle). In other words, the electric actuator 36 causes the power piston 45 to be moved in an axial direction of the master cylinder 21 to apply a thrust force to this power piston 45, thereby causing the primary piston 23 (and the secondary piston 24) of the master cylinder 21 to be displaced. For achieving this function, the electric actuator 36 includes the electric motor 37, the speed reduction mechanism 40, and the rotation-linear motion conversion mechanism 43. The speed reduction mechanism 40 transmits the rotation of the electric motor 37 to a cylindrical rotational member 41 while slowing down this rotation. The rotation-linear motion conversion mechanism 43 converts the rotation of the cylindrical rotational member 41 into an axial displacement of the power piston 45.

The electric motor 37 is constructed with use of, for example, a DC brushless motor, and includes a rotational shaft 37A, a rotor 37B, and a stator 37C. The rotational shaft 37A functions as a motor shaft (an output shaft). The rotor 37B is, for example, a permanent magnet attached to the rotational shaft 37A. The stator 37C is, for example, a coil (an armature) attached to the motor case 31A. An end portion of the rotational shaft 37A on one axial side is rotatably supported by the input case 31C of the booster housing 31 via a roller bearing 38.

The electric motor 37 is provided with the angle sensor 39 (refer to FIGS. 1 and 3) called a resolver or a rotational angle sensor. The angle sensor 39 detects a rotational angle (a rotational position) of the electric motor 37 (the rotational shaft 37A thereof), and outputs a detection signal thereof to the ECU 51. The ECU 51 performs feedback control of the electric motor 37 (i.e., the power piston 45) according to the rotational angle signal. Then, from the rotational angle of the electric motor 37 that is detected by the angle sensor 39, a movement amount (a displacement amount or a position) of the power piston 45 can be calculated by using a speed reduction rate of the speed reduction mechanism 40, which will be described below, and a linear motion displacement amount per unit rotational angle of the rotation-linear motion conversion mechanism 43.

Therefore, the angle sensor 39 forms a movement amount detector that detects the movement amount of the power piston 45 (the displacement amount or the position of the power piston 45). The movement amount detector is not limited to the resolver, and may be embodied by, for example, a rotary potentiometer. Further, the angle sensor 39 may detect the rotational angle after the speed is slowed down by the speed reduction mechanism 40 (for example, a rotational angle of the cylindrical rotational member 41) instead of the rotational angle (the rotational position) of the electric motor 37. Alternatively, for example, a displacement sensor (a position sensor) that directly detects the linear motion displacement (the axial displacement) of the power piston 45 may be used instead of the angle sensor 39 that indirectly detects the movement amount of the power piston 45. Alternatively, the linear motion displacement of a linear motion member 44 of the rotation-linear motion displacement mechanism 43 may be detected with use of a displacement sensor.

The speed reduction mechanism 40 is configured as, for example, a belt speed reduction mechanism. The speed reduction mechanism 40 includes a driving pulley 40A, a driven pulley 40B, and a belt 40C. The driving pulley 40A is attached to the rotational shaft 37A of the electric motor 37. The driven pulley 40B is attached to the cylindrical rotational member 41. The belt 40C is wound around between them. The speed reduction mechanism 40 transmits the rotation of the rotational shaft 37A of the electric motor 37 to the cylindrical rotational member 41 while slowing down this rotation at a predetermined speed reduction rate. The cylindrical rotational member 41 is rotatably supported by the input case 31C of the booster housing 31 via a roller bearing 42.

The rotation-linear motion conversion mechanism 43 is configured as, for example, a ball-screw mechanism. The rotation-linear motion mechanism 43 includes the cylindrical (hollow) linear motion member 44 provided axially movably via a plurality of balls on an inner peripheral side of the cylindrical rotational member 41. The power piston 45 is inserted inside the linear motion member 44 from an opening of the linear motion member 44 on the other axial side thereof. A flange portion 44A is provided at a position closer to an end portion of the linear motion member 44 on one axial side thereof. The flange portion 44A protrudes radially inward along an entire circumference. One end portion (a rear end portion) of the power piston 45 is in abutment with a surface (a front-side surface) of the flange portion 44A on the other side. Due to this abutment, the linear motion member 44 can be displaced to the other axial side (the front side) integrally with the power piston 45 on inner peripheral sides of the input case 31C and the cylindrical rotational member 41.

The power piston 45 is moved by being actuated by the electric actuator 36 so as to generate the braking hydraulic pressure in the master cylinder 21 to thus apply the braking hydraulic pressure to each of the wheel cylinders 4L, 4R, 5L, and 5R. The power piston 45 includes an outer cylindrical member 45A, an inner cylindrical member 45B, and an annular member 45C. The outer cylindrical member 45A is provided inside the linear motion member 44 so as to be able to be relatively displaced by being axially slidingly moved relative to the linear motion member 44. The inner cylindrical member 45B is provided inside the outer cylindrical member 45A. An end surface (one end surface) of the inner cylindrical member 45B on one axial side (a rear side) thereof is in abutment with the annular member 45C together with one end surface of the outer cylindrical member 45A. The piston member 34 of the input member 32 is fittedly inserted inside the inner cylindrical member 45B in an axially relatively movable manner (slidably movably).

A flange portion 45B1 is formed on the other axial side (a front side) of the inner cylindrical member 45B. The flange portion 45B1 protrudes radially inward along an entire circumference. This flange portion 45B1 faces (confronts) the reaction disk 47 together with the pressure reception portion 34B of the piston member 34. The annular member 45C is fixedly attached to an opening of the inner cylindrical member 45B on the one axial side by being threadably engaged therewith. A flange portion 45C1 is formed on an axially intermediate portion of the annular member 45C. The flange portion 45C1 protrudes radially outward along an entire circumference. The flange portion 44A of the linear motion member 44 is in abutment with one side surface of the flange portion 45C1. The outer cylindrical member 45A and the inner cylindrical member 45B are in abutment with the other side surface of the flange portion 45C1 of the annular member 45C.

The second return spring 46 is provided between the outer cylindrical member 45A of the power piston 45 and the output case 31B of the booster housing 31. The second return spring 46 constantly biases the power piston 45 in a braking release direction. Due to this configuration, the power piston 45 is returned to an initial position illustrated in FIG. 2 due to the driving force from the rotation of the electric motor 37 to a braking release side and the biasing force of the second return spring 46, when the brake operation is released.

The reaction disk 47 is provided between the power piston 45 (the inner cylindrical member 45B) and the input member 32 (the piston member 34), and the output rod 48. The reaction disk 47 is formed as, for example, a disk made from an elastic resin material such as rubber, and is in abutment with the input member 32 and the power piston 45. The reaction disk 47 transmits, to the output rod 48, the thrust force transmitted from the brake pedal 6 to the input member 32 (the piston member 34 thereof) (an input thrust force) and the thrust force transmitted from the electric actuator 36 to the power piston 45 (the inner cylindrical member 45B thereof) (a booster thrust force). This means that the reaction disk 47 distributes a reaction force of the braking hydraulic pressure generated in the master cylinder 21 to the input member 32 and the power piston 45.

Figure 5A:
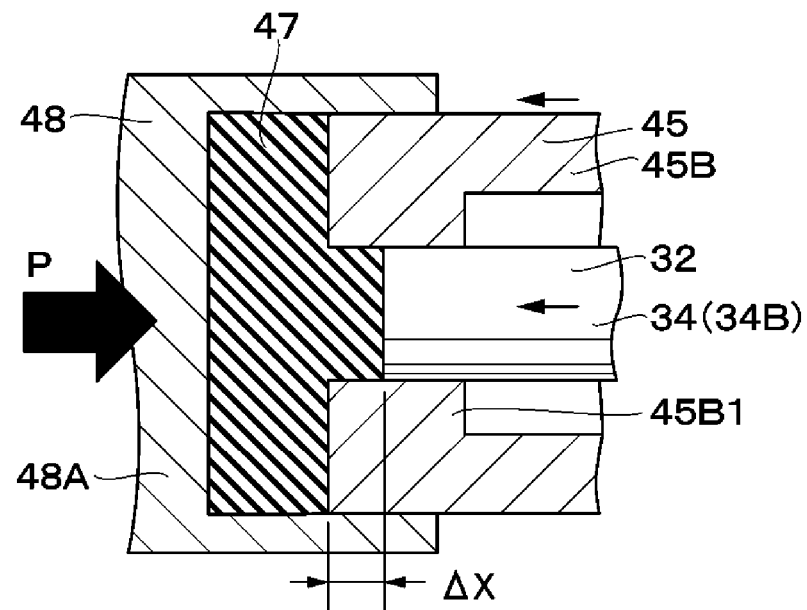
FIGS. 5(A) and 5(B) are cross-sectional views illustrating a power piston positional difference $\Delta Xpp$ between during a brake pedal operation and during automatic brake.
Figure 5B:
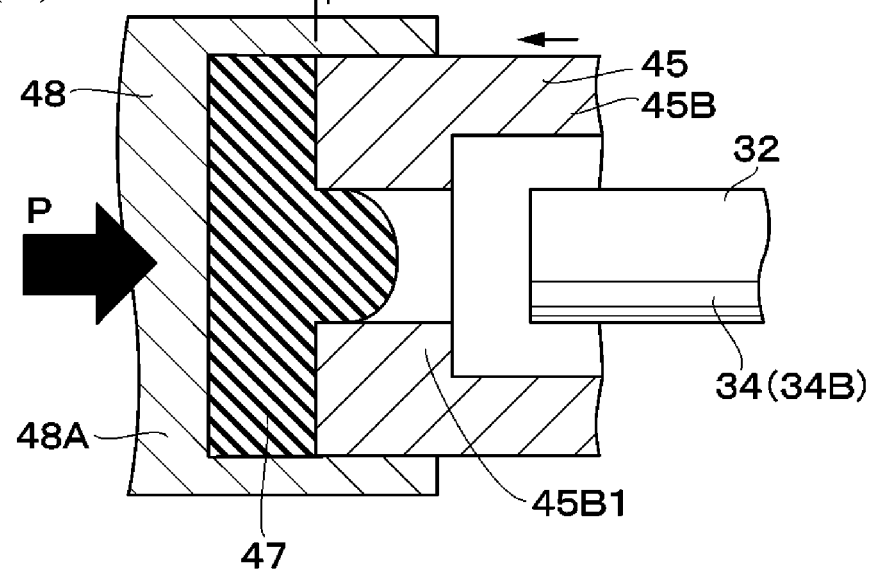

For example, when the brake pedal 6 is pressed and the power piston 45 is moved toward the reaction disk 47 side by the electric actuator 36 along with this pressing, the reaction disk 47 is, for example, elastically deformed as illustrated in FIG. 5(A), which will be described below. On the other hand, when only the power piston 45 is moved toward the reaction disk 47 side by the electric actuator 36 based on the automatic brake instruction without the brake pedal 6 operated (pressed), the reaction disk 47 is, for example, elastically deformed as illustrated in FIG. 5(B). In FIG. 5, the shape of the inner cylindrical member 45B of the power piston 45, the shape of the pressure reception portion 34B of the piston member 34, and the like are schematically illustrated compared to FIG. 2 for the purpose of facilitating better understanding of a power piston positional difference $\Delta Xpp$ and the like, which will be described below.

The output rod 48 functions to output the thrust force of the input member 32 and/or the thrust force of the power piston 45 to the master cylinder 21 (the primary piston 23 thereof). The output rod 48 includes a large-diameter flange portion 48A provided on one end side thereof. The flange portion 48A is fitted to the inner cylindrical member 45B of the power piston 45 from outside while sandwiching the reaction disk 47. The output rod 48 presses the primary piston 23 of the master cylinder 21 based on the thrust force of the input member 32 and/or the thrust force of the power piston 45.

Now, the rotation-linear motion conversion mechanism 43 has back-drivability, and can cause the cylindrical rotational member 41 to be rotated by the linear motion (the axial movement) of the linear motion member 44. As illustrated in FIG. 2, when the power piston 45 is retracted to a return position, the linear motion member 44 abuts against the closed end side of the input case 31C. This closed end functions as a stopper that restricts a return position of the power piston 45 via the linear motion member 44.

The flange portion 44A of the linear motion member 44 is in abutment with the power piston 45 (especially the annular member 45C of the power piston 45) from the rear side (the right side in FIG. 2). This allows the power piston 45 to be moved forward alone separately from the linear motion member 44. In other words, for example, when the electric booster 30 has some abnormality, such as a malfunction of the electric motor 37 due to a disconnection or the like, the linear motion member 44 is returned to the retracted position together with the power piston 45 due to the spring force of the second return spring 46. This can contribute to prevention or a reduction in a brake drag. On the other hand, when the braking force is applied, the hydraulic pressure can be generated in the master cylinder 21 by displacing the output rod 48 toward the master cylinder 21 side via the reaction disk 47 based on the forward movement of the input member 32. At this time, when the input member 32 is moved forward by a predetermined amount, the front end of the main body portion 34A of the piston member 34 abuts against the inner cylindrical member 45B (the flange portion 45B1 thereof) of the power piston 45 (refer to FIG. 2). As a result, the hydraulic pressure can be generated in the master cylinder 21 based on the forward movements of both the input member 32 and the power piston 45.

The speed reduction mechanism 40 is not limited to the belt speed reduction mechanism, and may be constructed with use of another type of speed reduction mechanism such as a gear reduction mechanism. Further, the rotation-linear motion mechanism 43, which converts the rotational motion into the linear motion, can also be constructed with use of, for example, a rack and pinion mechanism. Further, the speed reduction mechanism 40 does not necessarily have to be provided. For example, the electric booster 30 may be configured in such a manner that the cylindrical rotational member 41 is rotated directly by the electric motor, with the rotor of the electric motor provided at the cylindrical rotational member 41 and the stator of the electric motor also disposed around the cylindrical rotational member 41.

Further, in the above-described embodiment, the rotation-linear motion conversion mechanism 43 and the power piston 45 are configured as different members from each other, but a part of each of them may be integrally configured. For example, the linear motion member 44 of the rotation-linear motion conversion mechanism 43 may be integrated with the power piston 45.

Next, the electric booster ECU 51 will be described

The ECU 51 includes, for example, a microcomputer, and serves as an electric booster control unit that electrically controls driving of the electric motor 37. As illustrated in FIG. 1, an input side of the ECU 51 is connected to the brake operation sensor 7, the angle sensor 39, and the vehicle data bus 12. The brake operation sensor 7 detects the operation amount (or the pressing force) of the brake pedal 6. The angle sensor 39 detects the rotational position of the electric motor 37 (i.e., the movement amount of the power piston 45 corresponding to the rotational position of the electric motor 37). The vehicle data bus 12 provides and receives a signal to and from the ECU 10 or 16 of another vehicle apparatus. On the other hand, an output side of the ECU 51 is connected to the electric motor 37 and the vehicle data bus 12.

The ECU 51 drives the electric motor 37 so as to increase the pressure in the master cylinder 21 according to, for example, the detection signal output from the brake operation sensor 7 (the brake pedal operation amount, i.e., the input member position) and the automatic brake instruction from the ECU 16 (the automatic brake braking instruction value). More specifically, the ECU 51 moves (displaces) the power piston 45 by controlling the electric actuator 36 (the electric motor 37) based on the first braking instruction value (the input member position) based on the operation performed on the brake pedal 6, or the second braking instruction value (the automatic brake instruction) input from the vehicle data bus 12 serving as the communication network between apparatuses of the vehicle. In other words, the ECU 51 variably controls the braking hydraulic pressure to be generated in the master cylinder 21 by driving the electric motor 37 and moving the power piston 45 based on the input member position or the automatic brake instruction.

In this case, when the driving signal is output from the ECU 51 to the electric motor 37, the rotational shaft 37A of the electric motor 37 is rotated. The rotation of the rotational shaft 37A is slowed down by the speed reduction mechanism 40, and is converted into the linear motion displacement (the displacement in the left-right direction in FIG. 2) by the rotation-linear motion conversion mechanism 43 to cause the linear motion displacement of the power piston 45. The rotational angle of the rotational shaft 37A of the electric motor 37, i.e., the rotational angle (the motor rotational position) of the rotor 37B is detected by the angle sensor 39. In this case, the movement amount of the power piston 45 can be calculated with use of the rotational angle detected by the angle sensor 39, the speed reduction rate of the speed reduction mechanism 40, and the linear motion displacement amount per unit rotational angle of the rotation-linear motion conversion mechanism 43. The detected angle may be the rotational angle after the speed is slowed down instead of the rotational angle of the rotor 37B. Alternatively, the displacement sensor that directly detects the linear motion displacement of the power piston 45 may be used instead of the angle sensor 39.

The reaction disk 47, which is the elastic member, is attached at the distal end of the power piston 45 (the inner cylindrical member 45B), and the displacement of the power piston 45 is transmitted to the primary piston 23 of the master cylinder 21 via the reaction disk 47. In FIG. 2, the primary piston 23 does not block the route for supplying the brake fluid that connects the reservoir 29 and the master cylinder 21 to each other, and the hydraulic pressure is not generated inside the master cylinder 21 (the hydraulic chambers 25 and 26). From this state, the hydraulic pressure can be generated in the master cylinder 21 by driving the electric motor 37, displacing the primary piston 23 leftward in FIG. 2, blocking the route for supplying the brake fluid that connects the reservoir 29 and the master cylinder 21 to each other, and further displaying the primary piston 23. The power piston 45 has the cylindrical shape as a whole, and the input member 32 is inserted through inside the power piston 45. The input member 32 is installed so as to be slidable relative to the power piston 45 independently of the displacement of the power piston 45 and so as to be contactable at a distal end thereof with the reaction disk 47.

Now, suppose that the electric booster 30 is configured to feed back the actual braking hydraulic pressure detected by the hydraulic sensor 15 to, for example, an instruction regarding the target hydraulic pressure to be generated in the master cylinder 21 when generating a desired braking force by actuating the electric motor 37 of the electric booster 30. In this case, for example, if the detection value of the hydraulic sensor 15 contains an error or a delay, the actually generated braking hydraulic pressure may deviate from the target hydraulic pressure unless some correction is made thereto. To address this problem, one possible method therefor is, for example, to feed back the actual movement amount (motor rotational position) of the power piston 45 that is detected by the angle sensor 45 to the instruction regarding the movement amount (the position) of the power piston 45 of the electric booster 30. In this case, it is possible to eliminate or reduce the difference in the braking hydraulic pressure that accompanies the error or the delay in the detection value of the hydraulic sensor 15.

On the other hand, suppose that the electric booster 30 is configured to calculate the movement amount of the power piston 45 corresponding to the instruction regarding the target hydraulic pressure with use of a brake characteristic indicating a relationship between the movement amount (the motor rotational position) of the power piston 45 and the hydraulic pressure generated in the master cylinder 21, and control the electric actuator 36 (the electric motor 37) so as to achieve the calculated movement amount. In this case, the following fact should be taken into consideration. That is, in the case of the electric booster 30 illustrated in FIG. 2, the brake characteristic indicating the relationship between the movement amount of the power piston 45 and the hydraulic pressure generated in the master cylinder 21 varies depending on the movement amount of the input member 32 coupled with the brake pedal 6, and this should be taken into consideration.

For example, a first brake characteristic is defined to be a brake characteristic when the hydraulic pressure is generated in the master cylinder 21 by moving the power piston 45 based on the operation performed on the brake pedal 6. On the other hand, a second brake characteristic is defined to be a brake characteristic when the hydraulic pressure is generated in the master cylinder 21 by moving the power piston 45 based on a braking instruction (the automatic brake instruction) transmitted from another ECU (for example, the ECU 16) without the brake pedal 6 operated. The first brake characteristic and the second brake characteristic are different from each other in characteristics (relationships between the movement amount of the power piston 45 and the hydraulic pressure generated in the master cylinder 21), as the operation amount of the brake pedal 6 (i.e., the movement amount of the input member 32) is different therebetween.

Therefore, even with the power piston 45 moved by the same amount by the electric actuator 36 (the electric motor 37), the first brake characteristic and the second brake characteristic may result in a difference in the actually generated hydraulic pressure if the input member 32 is moved by different amounts. This means that, when the movement amount of the power piston 45 for satisfying the braking instruction (the target hydraulic pressure) transmitted from the other ECU 16 is calculated with use of the brake characteristic indicating the relationship between the movement amount of the power piston 45 and the hydraulic pressure generated in the master cylinder 21 which characteristic is calculated when the brake pedal 6 is operated (the first brake characteristic), the actually generated braking hydraulic pressure may deviate from the braking hydraulic pressure corresponding to the braking instruction desired to be satisfied because of the absence of the operation on the brake pedal 6.

Figure 3:
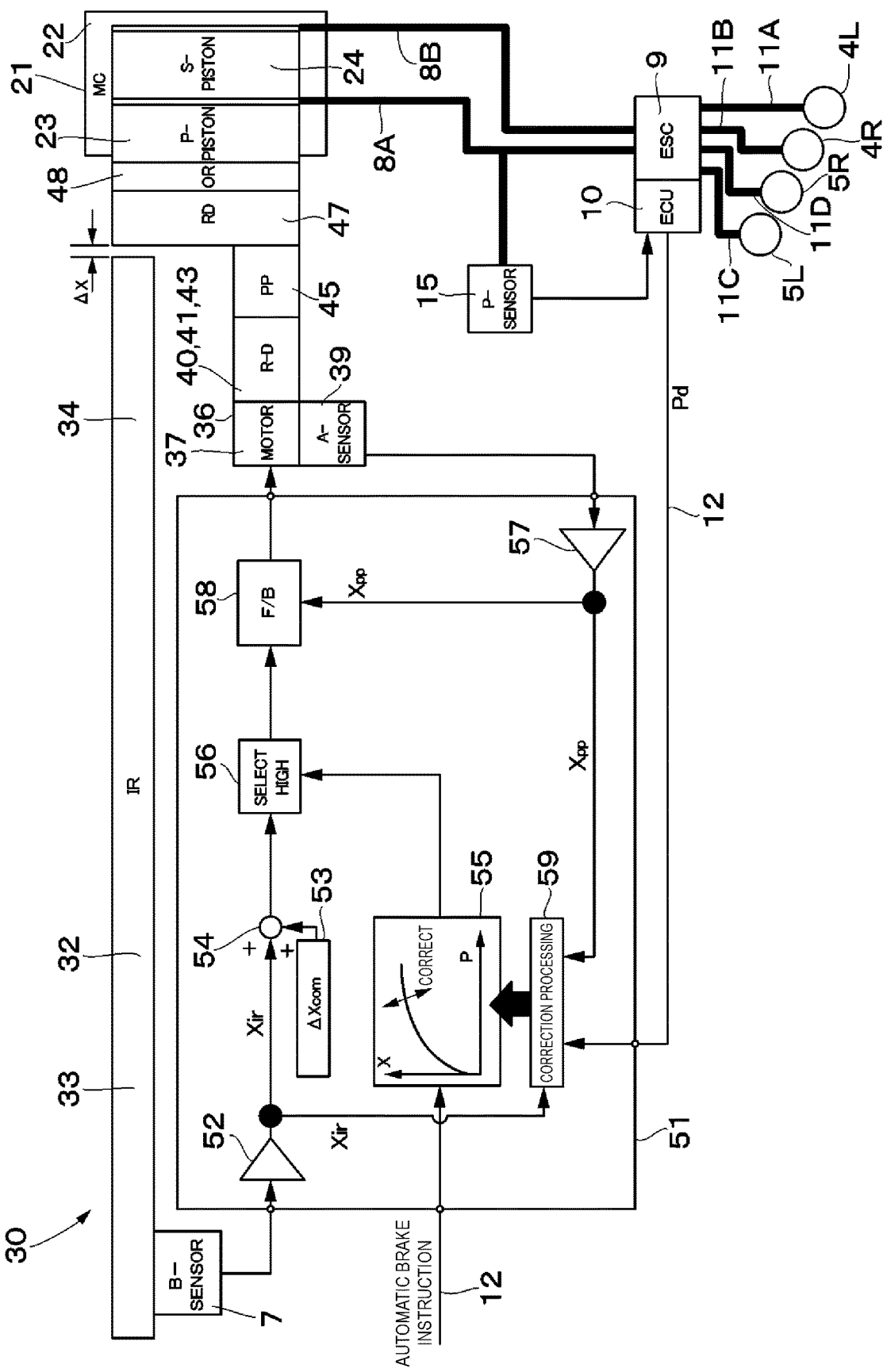

Therefore, in the present embodiment, the electric booster ECU 51, which controls the electric actuator 36 (the electric motor 37), is configured in the following manner so as to be able to accurately generate the braking hydraulic pressure. The configuration of the ECU 51 will be described with additional reference to FIG. 3 along with FIGS. 1 and 2. FIG. 3 is a block diagram illustrating a configuration and signals relating to the operation of generating the hydraulic pressure by the electric booster 30 illustrated in FIGS. 1 and 2, and processing performed inside the ECU 51.

As illustrated in FIG. 3, the electric booster ECU 51 includes a brake operation input portion 52, a relative displacement amount setting portion 53, an addition portion 54, a brake characteristic portion 55, a selection portion 56, an angle input portion 57, a feedback portion 58, and a characteristic correction processing portion 59. An input side of the brake operation input portion 52 is connected to the brake operation sensor 7, and an output side thereof is connected to the addition portion 54 and the characteristic correction processing portion 59. The brake operation input portion 52 amplifies the detection signal output from the brake operation sensor 7, and also outputs this amplified detection signal to the addition portion 54 and the characteristic correction processing portion 59 as an input member position (the brake pedal operation amount) Xir.

The relative displacement amount setting portion 53 functions to set, for example, a relative displacement amount ΔXcom corresponding to a distance from a contact surface (a PR contact surface) between the power piston 45 (the inner cylindrical member 45B) and the reaction disk 47 to the distal end surface of the input member 32 (the pressure reception portion 34B of the piston member 34). In other words, the relative displacement amount setting portion 53 functions to set the relative displacement amount ΔXcom desired to be held (maintained) between the PR contact surface and the distal end surface. An output side of the relative displacement amount setting portion 53 is connected to the addition portion 54, and the relative displacement amount ΔXcom set by the relative displacement amount setting portion 53 is output to the addition portion 54. The relative displacement amount ΔXcom is a value set so as to be able to acquire a desired pedal feeling, and may be set to a constant value (a fixed value) or may be set to a variable value varying according to, for example, a change in a driving situation such as a change in a vehicle speed.

An input side of the addition portion 54 is connected to the brake operation input portion 52 and the relative displacement amount setting portion 53, and an output side thereof is connected to the selection portion 56. The addition portion 54 adds the relative displacement amount ΔXcom output from the relative displacement mount setting portion 53 to the input member position Xir output from the brake operation input portion 52. The addition portion 54 outputs the added value (a sum) to the selection portion 56 as a "power piston position instruction during the pedal operation."

An input side of the brake characteristic portion 55 is connected to the vehicle data bus 12 and the characteristic correction processing portion 59, and an output side thereof is connected to the selection portion 56. For example, the automatic brake instruction output from the ECU 16 via the vehicle data bus 12 is input to the brake characteristic portion 55. The automatic brake instruction is input to, for example, the brake characteristic portion 55 as the hydraulic value to be generated in the master cylinder 21. The brake characteristic portion 55 calculates the power piston position corresponding to the inputted automatic brake instruction (the hydraulic value) based on the brake characteristic (characteristic data) indicating the relationship between the hydraulic pressure generated in the master cylinder 21 (the hydraulic value) and the position of the power piston 45, i.e., a "hydraulic pressure P-power piston position X characteristic."

Then, the brake characteristic of the brake characteristic portion 55 is stored in a memory of the ECU 51. The brake characteristic corrected by the characteristic correction processing portion 59 is stored in the memory of the ECU 51 in an updatable manner. Therefore, when the automatic brake instruction is input via the vehicle data bus 12, the brake characteristic portion 55 calculates the power piston position corresponding to the braking hydraulic pressure desired to be realized by this automatic brake instruction, based on the corrected brake characteristic. The brake characteristic portion 55 outputs the calculated power piston position to the selection portion 56 as a "power piston position instruction during the automatic brake."

An input side of the selection portion 56 is connected to the addition portion 54 and the brake characteristic portion 55, and an output side thereof is connected to the feedback portion 58. The selection portion 56 compares the "power piston position instruction during the pedal operation" output from the addition portion 54 and the "power piston position instruction during the automatic brake" output from the brake characteristic portion 55, and also selects a larger one of them. The selection portion 56 outputs the selected position instruction to the feedback portion 58 as the "power piston position instruction."

An input side of the angle input portion 57 is connected to the angle sensor 39, and an output side thereof is connected to the feedback portion 58 and the characteristic correction processing portion 59. The angle input portion 57 amplifies the detection signal output from the angle sensor 39, and also outputs the detection signal thereof to the feedback portion 58 and the characteristic correction processing portion 59 as the power piston position.

An input side of the feedback portion 58 is connected to the selection portion 56 and the angle input portion 57, and an output side thereof is connected to the electric motor 37. From the "power piston position instruction" output from the selection portion 56 and the (actual) power piston position output from the angle input portion 57, the feedback portion 58 calculates, for example, a deviation (a positional deviation) between them. The feedback portion 58 outputs a driving signal to the electric motor 37 for driving the electric motor 37 so as to eliminate this deviation. The electric motor 37 is driven (rotated) based on the driving signal output from the feedback portion 58.

The characteristic correction processing portion 59 corrects the brake characteristic used by the brake characteristic portion 55, i.e., the brake characteristic stored in the memory of the ECU 51. An input side of the characteristic correction processing portion 59 is connected to the brake operation input portion 52, the angle input portion 57, and the vehicle data bus 12, and an output side thereof is connected to the brake characteristic portion 55. The "input member position Xir" output from the brake operation input portion 52 and the "power piston position Xpp" output from the angle input portion 57 are input to the characteristic correction processing portion 59. In addition thereto, a "hydraulic value Pd" output from the ECU 10 via the vehicle data bus 12 is input to the characteristic correction processing portion 59. The "hydraulic value Pd" is the hydraulic value detected by the hydraulic sensor 15, and corresponds to the hydraulic value in the hydraulic chamber 25 of the master cylinder 21 (the hydraulic value in the cylinder-side hydraulic pipe 8A).

The characteristic correction processing portion 59 calculates a relationship between the "hydraulic value P" and the "power piston position X" when the brake pedal 6 is not operated, from the detection values when the power piston 45 is moved based on the operation on the brake pedal 6 and the hydraulic pressure is generated in the master cylinder 21, i.e., the "power piston position Xpp" detected by the angle sensor 39, the "hydraulic value Pd" detected by the hydraulic sensor 15, and the "input member position Xir" detected by the brake operation sensor 7 at this time. In other words, the characteristic correction processing portion 59 calculates the brake characteristic indicating the relationship between the "hydraulic value P" and the "power piston position X" when the brake pedal 6 is not operated by correcting the brake characteristic indicating the relationship between the "hydraulic value Pd" and the "power piston position Xpp" when the brake pedal 6 is operated (when the first braking instruction value is input) based on the "input member position Xir", which corresponds to the operation amount of the brake pedal 6.

The characteristic correction processing portion 59 outputs this calculated brake characteristic (the corrected brake characteristic) to the brake characteristic portion 55 (i.e., stores the corrected brake characteristic into the memory of the ECU 51. Due to this output, the brake characteristic portion 55 can calculate (output) the "power piston position instruction during the automatic brake" based on the corrected characteristic data (the brake characteristic indicating the relationship between the "hydraulic value P" and the "power piston position X" when the brake pedal 6 is not operated), when the automatic brake instruction is input. The configuration of the characteristic correction processing portion 59 will be described in further detail below.

When the brake pedal 6 is operated, the position of the input member 32 (the input member position Xir) detected by the brake operation sensor 7 is input to the electric booster ECU 51 as the first braking instruction value. When the first braking instruction value is input in this manner, the ECU 51 drives the electric actuator 36 based on the input member position Xir to move the power piston 45, thereby generating the braking hydraulic pressure in the master cylinder 21. At this time (while the braking hydraulic pressure is generated), the ECU 51 corrects the characteristic data (the brake characteristic) indicating the relationship between the braking hydraulic value in the master cylinder 21 that is transmitted (input) from the ECU 10 via the vehicle data bus 12 (i.e., the hydraulic value Pd detected by the hydraulic sensor 15) and the movement amount of the power piston 45 controlled based on the input member position Xir (i.e., the power piston position Xpp detected by the angle sensor 39), based on the operation amount of the brake pedal 6 (i.e., the input member position Xir detected by the brake operation sensor 7), and stores it. In this case, the ECU 51 calculates the correction of the characteristic data in consideration of a deformation amount of the reaction disk 47. Further, the ECU 51 calculates the correction of the characteristic data in consideration of a time taken for the transmission via the vehicle data bus 12. Then, the ECU 51 controls the electric actuator 36 (the electric motor 37) based on the corrected characteristic data when the automatic brake instruction, which corresponds to the second braking instruction value, is input.

The electric booster 30 according to the embodiment is configured in the above-described manner, and, next, an operation thereof will be described.

First, processing and an operation of the electric booster 30 for generating the hydraulic pressure in the master cylinder 21 based on the operation performed on the brake pedal 6 by the driver will be described. When there is neither the operation performed on the brake pedal 6 by the driver nor the automatic brake instruction (the automatic brake instruction value=0), the electric booster ECU 51 calculates the power piston position instruction serving as the instruction directed to the position of the power piston 45 in the following manner. That is, in this case, the ECU 51 calculates such a power piston position instruction that the power piston 45 maintains the relative displacement between the power piston 45 and the input member 32 so as not to block the route for supplying the brake fluid that connects the reservoir 29 and the master cylinder 21 to each other and so as to prohibit the distal end of the input member 32 (the distal end of the pressure reception portion 34B of the piston member 34) from contacting (abutting against) the reaction disk 47. Then, the ECU 51 outputs the driving signal to the electric motor 37 so as to maintain the position of the power piston 45.

More specifically, the ECU 51 converts the detection signal of the brake operation sensor 7 into the input member position Xir (the brake operation input portion 52), and adds the relative displacement amount ΔXcom from the power piston position desired to be maintained to the converted input member position Xir (the addition portion 54). When the automatic brake instruction is not issued, a value calculated from the addition is set as the "power piston position instruction" and is input to the feedback portion 58. The feedback portion 58 calculates the motor driving signal in such a manner that the calculated "power piston position instruction" and the "power piston position Xpp" calculated by converting the detection signal of the angle sensor 39 match each other. A known feedback control technique can be used for this calculation of the motor driving signal.

Now, the relative displacement amount ΔXcom added to the input member position Xir is a value for setting the distance from the contact surface (the PR contact surface) between the power piston 45 (the inner cylindrical member 45B) and the reaction disk 47 to the distal end of the input member 32 (the pressure reception portion 34B of the piston member 34) as an arbitrary value. More specifically, the relative displacement amount ΔXcom is determined in consideration of dimensions of parts forming the electric booster 30 and respective relationships of the input member position and the power piston position recognized by the ECU 51 with an origin point.

In the present embodiment, for simplification, it is defined that the relative displacement amount ΔXcom is the distance itself from the contact surface (the PR contact surface) between the power piston 45 and the reaction disk 47 to the distal end of the input member 32 (the distal end of the input member). Due to this definition, the position of the power piston 45 can be displaced so as to keep the distance between the distal end of the input member and the PR contact surface at the arbitrary relative displacement amount ΔX independently of the brake pedal operation amount (i.e., the input member position). Therefore, the power piston 45 can be displaced according to the operation on the brake pedal 6 and then the displacement of the input member 32.

In this manner, operating the brake pedal to displace the power piston 45 causes the primary piston 23 to be moved via the reaction disk 47, block the route for supplying the brake fluid that connects the reservoir 29 and the master cylinder 21 to each other, and thereby generating the hydraulic pressure in the master cylinder 21. Now, the reaction disk 47 is the elastic member, and, when the hydraulic pressure is not generated and a small force is transmitted from the primary piston 23 to the reaction disk 47, the distance between the distal end of the input member 32 and the reaction disk 47 is approximately equal to the distance between the distal end of the input member 32 and the PR contact surface.

However, when the hydraulic pressure is generated inside the master cylinder 21 and a large force starts to be transmitted from the primary piston 23 to the reaction disk 47, the reaction disk 47 is compressed. At this time, the reaction disk 47 is deformed so as to reduce the distance to the distal end of the input member 32. Then, when the deformation amount of the reaction disk 47 increases according to an increase in the hydraulic pressure, the distance to the distal end of the input member 32 further reduces, and the reaction disk 47 and the distal end of the input member 32 are eventually brought into contact with each other. As a result, the reaction force transmitted to the reaction disk 47 according to the generated hydraulic pressure stars to be distributed at a ratio between a "contact area between the power piston 45 and the reaction disk 47" and a "contact area between the input member 32 and the reaction disk 47", and transmitted to each of them.

Next, processing for generating the hydraulic pressure in the master cylinder 21 according to the automatic brake instruction will be described. Generally, the automatic brake instruction is transmitted as a value expressed by a physical amount such as a braking torque to be realized by, for example, the wheels 2L, 2R, 3L, and 3R and a deceleration to be realized as the vehicle, besides the hydraulic value in the master cylinder 21 (the hydraulic value to be realized by the master cylinder 21). Any of them is basically proportional to the hydraulic value in the master cylinder 21. Therefore, in the present embodiment, for simplification, assume that the automatic brake instruction is transmitted as the hydraulic value.

In the case where the electric booster 30 and the hydraulic sensor 15 are not directly connected to each other and the electric booster 30 recognizes (acquires) the hydraulic value via the vehicle data bus 12 serving as the communication network between vehicle ECUs, like the present embodiment, the hydraulic value recognized by the electric booster 30 is a value acquired with a time delay from the actual hydraulic value in relation to a communication cycle of the data bus and also corrected per longer cycle compared to when the electric booster 30 and the hydraulic sensor 15 are directly connected to each other. Therefore, for example, if the feedback control is performed with use of the hydraulic value acquired via the vehicle data bus 12 without any adjustment made thereto for the automatic brake instruction serving as the instruction regarding the hydraulic value, the automatic brake instruction may be unable to be satisfied with high responsiveness.

Therefore, in the present embodiment, the electric booster 30 employs the following configurations (1) and (2) to satisfy the transmitted automatic brake instruction with high responsiveness even when using such a value (the hydraulic value) acquired via the vehicle data bus 12. (1) The electric booster 30 stores, in the ECU 51 in advance, the brake characteristic (the hydraulic pressure P–power piston position X characteristic) that models the brake characteristic of the vehicle with the electric booster 30 mounted thereon as the relationship between the power piston position and the generated hydraulic pressure. (2) The ECU 51 performs feedback control similar to the feedback control at the time of the brake pedal operation, with use of the above-described brake characteristic (the hydraulic pressure P–power piston position X characteristic) at the time of the automatic brake instruction. More specifically, the ECU 51 converts the received automatic brake instruction (hydraulic pressure) into the power piston position instruction with use of the above-described brake characteristic and also performs the feedback control of the power piston position so as to satisfy this converted power piston position instruction.

At this time, the power piston position instruction is calculated based on the automatic brake instruction, which means that only the power piston 45 starts being moved with the input member 32 still not displaced and generates the braking hydraulic pressure. Therefore, unlike during the brake pedal operation, the reaction disk 47 does not contact with the distal end of the input member 32 even when being compressed and deformed. In other words, at the time of the brake pedal operation, the reaction disk 47 and the input member 32 contact each other as illustrated in FIG. 5(A). On the other hand, at the time of the automatic brake instruction, the reaction disk 47 and the input member 32 do not contact each other as illustrated in FIG. 5(B).

In this case, if the operation on the brake pedal 6 and the reception of the automatic brake instruction are performed at the same time, this situation can be dealt with by selecting a greater one of the power piston position instructions respectively calculated for them and operating so as to satisfy the selected power piston position instruction. More specifically, the selection portion 56 selects the greater one of the power piston position instructions, and the feedback portion 58 performs the feedback control so as to satisfy the selected power piston position instruction.

Further, to accurately satisfy the automatic brake instruction, the brake characteristic (the hydraulic pressure P–power piston position X characteristic) should be a similar characteristic to the brake characteristic of the vehicle on which the electric booster 30 is actually mounted on. In this case, the brake characteristic of the vehicle changes from moment to moment due to wear states and temperatures of respective pads of the individual wheel cylinders 4L, 4R, 5L, and 5R, a hydraulic pressure generated immediately before that, and the like, in addition to a variation in parts. Therefore, in the embodiment, the brake characteristic (the hydraulic pressure P–power piston position X characteristic)

is corrected so as to be able to accurately satisfy the automatic brake instruction regardless of these changes.

Figure 4:
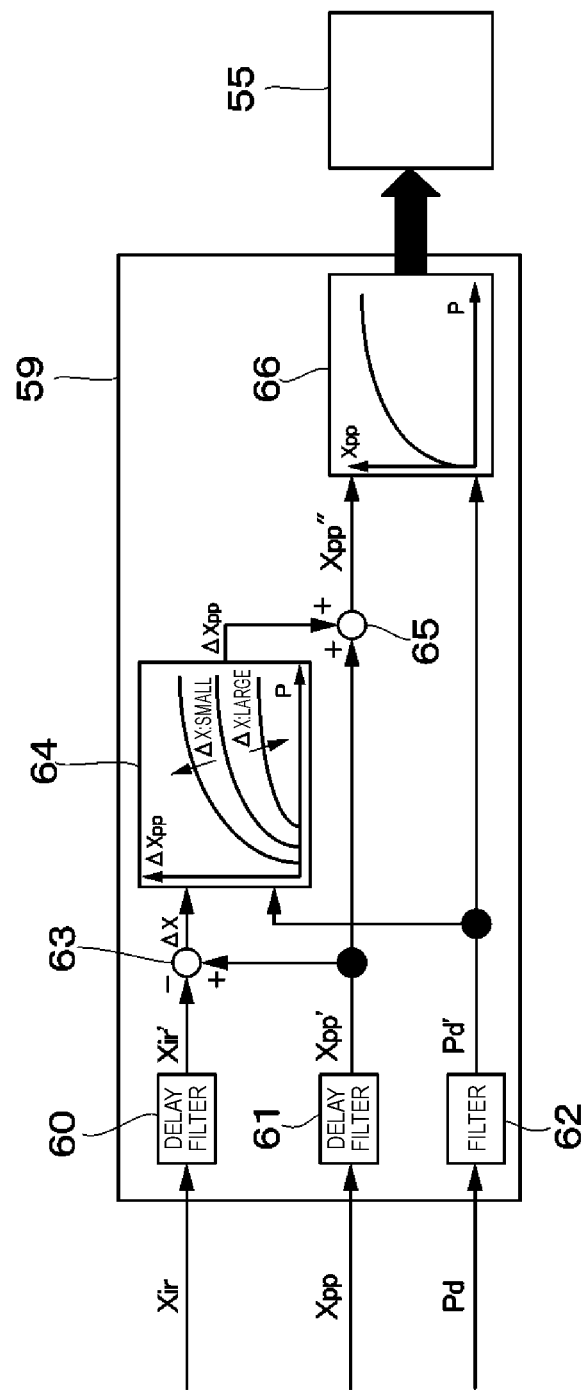
FIG. 4 is a block diagram illustrating a characteristic correction processing portion of a controller (an electric booster ECU) in FIG. 3.

Next, correction processing for correcting the brake characteristic (the hydraulic pressure P–power piston position X characteristic) used by the brake characteristic portion 55, i.e., the configuration of the characteristic correction processing portion 59 will be described with additional reference to FIGS. 4 to 7 along with FIGS. 1 to 3. In this case, FIG. 4 is a block diagram illustrating the characteristic correction processing portion 59 of the ECU 51 in FIG. 3.

In the present embodiment, the brake characteristic (the hydraulic pressure P–power piston position X characteristic) used by the brake characteristic portion 55 is intended to be used to convert the hydraulic value P serving as the automatic brake instruction into the power piston position instruction X when the automatic brake instruction is received, and is not used when the brake pedal 6 is operated. Therefore, the characteristic correction processing portion 59 corrects the brake characteristic (the hydraulic pressure P–power piston position X characteristic) with use of the "input member position Xir," the "power piston position Xpp," and the "hydraulic value Pd" realized when the brake pedal is operated.

As described above, while the braking hydraulic pressure is generated with the contact established between the reaction disk 47 and the distal end of the input member 32 at the time of the brake operation, the braking hydraulic pressure is generated with the reaction disk 47 and the distal end of the input member 32 keeping out of contact with each other when the automatic bake instruction is received. FIG. 5 schematically illustrates the deformation of the reaction disk 47 at this time and the positional relationship between the input member 32 (the piston member 34 thereof), the power piston 45 (the inner cylindrical member 45B thereof), and the output rod 48 (=the primary piston 23). In this case, FIG. 5(A) illustrates the positional relationship at the time of the brake operation, and FIG. 5(B) illustrates the positional relationship when the automatic brake instruction is received.

In a case where the actual brake characteristic of the vehicle does not change, the primary piston 23 should be changed to the same position to realize the same hydraulic pressure. Now, as illustrated in FIG. 5(A), when the brake pedal is operated, even if the reaction disk 47 is deformed due to the hydraulic reaction force, the deformation of the reaction disk 47 is limited at the moment that the reaction disk 47 contacts the distal end of the input member 32 because the distal end of the input member 32 is located at a position separated by a distance ΔX from the PR contact surface (the contact surface between the power piston 45 and the reaction disk 47).

Figure 6:
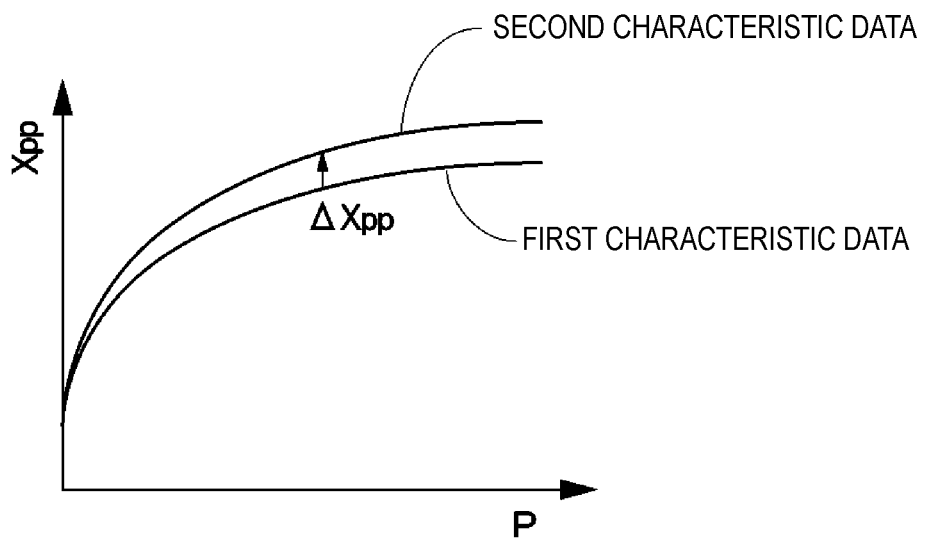
FIG. 6 illustrates characteristic lines each representing one example of a relationship between a hydraulic pressure P and a power piston position Xpp.
Figure 7:
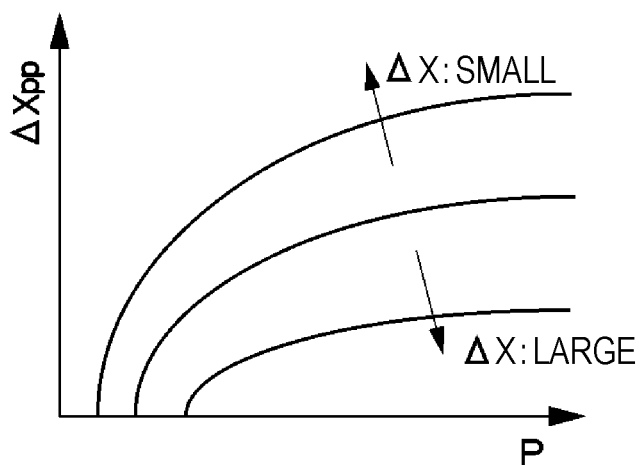
FIG. 7 illustrates characteristic lines each representing one example of a relationship between the hydraulic pressure P and the power piston positional difference $\Delta Xpp$.

On the other hand, as illustrated in FIG. 5(B), when the automatic brake instruction is received, the reaction disk 47 does not contact the input member 32, and therefore the reaction disk 47 is considerably deformed compared to when the brake pedal is operated. Therefore, the movement amount of the power piston 45 required to generate the same hydraulic pressure is larger by ΔXpp in the characteristic when the automatic brake instruction is received (SECOND CHARACTERISTIC DATA illustrated in FIG. 6) than in the characteristic when the brake pedal is operated (FIRST CHARACTERISTIC DATA illustrated in FIG. 6), as illustrated in FIG. 6. Further, ΔXpp, i.e., the power piston positional difference ΔXpp between when the brake pedal is operated and when the automatic brake instruction is received also changes according to the distance ΔX from the PR contact surface (the contact surface between the power piston 45 and the reaction disk 47) to the distal end of the input member 32 in addition to changing according to the generated hydraulic pressure, as illustrated in FIG. 7.

The power piston positional difference ΔXpp tends to increase as the generated hydraulic pressure increases. In addition thereto, the power piston positional difference ΔXpp increases according to a reduction in the value of the distance ΔX (the difference in the power piston position increases between when the brake pedal is operated and when the automatic brake instruction received), and reduces according to an increase in the value of the distance ΔX (the difference in the power piston position reduces between when the brake pedal is operated and when the automatic brake instruction is received). Further, this characteristic also changes according to the shape of the distal end of the input member 32, the ratio between the "contact area between the power piston 45 and the reaction disk 47" and the "contact area between the input member 32 and the reaction disk 47," a pressure reception area of the primary piston 23 that receives the hydraulic reaction force, and the like, besides a material (a material characteristic) and a dimension of the reaction disk 47.

In the present embodiment, the electric booster 30 calculates the power piston positional difference ΔXpp with use of the hydraulic value Pd (detected by the hydraulic sensor 15), the power piston position ΔXpp (detected by the angle sensor 39), and the input member position Xir (detected by the brake operation sensor 7) when the brake pedal is operated, and reflects it to the correction of the brake characteristic (the hydraulic pressure P–power piston position X characteristic). Further, the brake characteristic of the vehicle (the hydraulic pressure P–power piston position X characteristic) is different between when the hydraulic pressure increases and when the hydraulic pressure reduces mainly due to characteristics of the wheel cylinders 4L, 4R, 5L, and 5R. Therefore, it is desirable to employ, as the value for use in the correction, a value while the brake pedal operation amount is increasing among values when the brake pedal is operated, i.e., a value while the hydraulic value Pd, the power piston position Xpp, and the input member position Xir are increasing. In other words, the ECU 51 corrects the characteristic data when the operation amount of the brake pedal 6 is increasing (when the braking hydraulic value Pd and the movement amount Xpp of the power piston 45 are increasing).

Further, when the ABS function, an electronic stability control function, or the like operates by the ESC 9 mounted on the vehicle, i.e., during the operation of the function for increasing/reducing the hydraulic pressures in the wheel cylinders 4L, 4R, 5L and 5R independently of the hydraulic pressure generated by the master cylinder 21, the brake characteristic (the hydraulic pressure P–power piston position X characteristic) largely changes. Therefore, use of the value at this time undesirably leads to a correction of a characteristic different from the characteristic when such a function is out of operation. Therefore, it is desirable to refrain from using, for the correction of the characteristic, the value when the above-described function is in operation with use of the change amount of the hydraulic value and the signal transmitted in the vehicle data bus 12. In other words, the ECU 51 prohibits the correction of the characteristic data when the ESC 9 is in operation and the hydraulic pressures in the wheel cylinders 4L, 4R, 5L, and 5R are increasing/reducing.

Now, as illustrated in FIG. 4, the characteristic correction processing portion 59 includes an input member position delay consideration filter 60, a power piston position delay consideration filter 61, a hydraulic value filter 62, a ΔX calculation portion 63, a positional difference characteristic portion 64, an addition portion 65, and a correction brake characteristic portion 66.

An input side of the input member position delay consideration filter 60 is connected to the brake operation input portion 52 (FIG. 3), and an output side thereof is connected to the ΔX calculation portion 63. The "input member position Xir" is input from the brake operation sensor 7 directly connected to the ECU 51 to the input member position delay consideration filter 60 via the brake operation input portion 52. An input side of the power piston position delay consideration filter 61 is connected to the angle input portion 57 (FIG. 3), and an output side thereof is connected to the ΔX calculation portion 63 and the addition portion 65. The "power piston position Xpp" is input from the angle sensor 39 directly connected to the ECU 51 to the power piston position delay consideration filter 61 via the angle input portion 57.

As described above, the hydraulic value Pd of the master cylinder 21 is received via the vehicle data bus 12, and therefore is subjected to the delay with respect to the actual hydraulic value (the transmission time), such as a delay due to the detection processing and the transmission processing inside the hydraulic pressure supply apparatus ECU 10 that directly recognizes (acquires) the detection signal of the hydraulic sensor 15, and a delay in the recognition processing in the electric booster ECU 51. Therefore, the input member position delay consideration filter 60 performs filter processing (delay processing), for delaying the value by a time corresponding to the delay in the hydraulic value Pd, on the input member position Xir for which the detection signal is directly recognized (acquired). In other words, the input member position delay consideration filter 60 calculates an input member position Xir' temporally synchronized with the hydraulic value Pd, and outputs this input member position Xir' to the ΔX calculation portion 63.

Further, the power piston position delay consideration filter 61 performs filter processing (delay processing), for delaying the value by a time corresponding to the delay in the hydraulic value Pd, on the piston position Xpp for which the detection signal is directly recognized (acquired). In other words, the power piston position delay consideration filter 61 calculates a power piston position Xpp' temporally synchronized with the hydraulic value Pd, and outputs this power piston position Xpp' to the ΔX calculation portion 63 and the addition portion 65.

On the other hand, an input side of the hydraulic value filter 62 is connected to the vehicle data bus 12, and an output side thereof is connected to the positional difference characteristic portion 64 and the correction brake characteristic portion 66. The "hydraulic value Pd" from the hydraulic sensor 15 connected to the ECU 10 is input from the ECU 10 to the hydraulic value filter 62 via the vehicle data bus 12. The hydraulic value filter 62 performs, for example, filter processing intended to remove noise (noise removal processing) on the inputted hydraulic value Pd, and outputs the hydraulic value Pd' with the noise removed therefrom to the positional difference characteristic portion 64 and the correction brake characteristic portion 66. In the case where the noise removal processing is performed on the hydraulic value Pd in this manner, the input member position delay consideration filter 60 and the power piston position delay consideration filter 61 also perform noise removal processing similar to the hydraulic value filter 62 in addition to the delay processing.

An input side of the ΔX calculation portion 63 is connected to the input member position delay consideration filter 60 and the power piston position delay consideration filter 61, and an output side thereof is connected to the positional difference characteristic portion 64. The input member position Xir' and the power piston position Xpp' subjected to the delay processing (and the noise removal processing) are input to the ΔX calculation portion 63. In other words, the input member position Xir' and the power piston position Xpp' temporally synchronized with the hydraulic value are input to the ΔX calculation portion 63. The ΔX calculation portion 63 calculates ΔX temporally synchronized with the hydraulic value Pd by subtracting the input member position Xir' from the inputted power piston position Xpp'. The ΔX calculation portion 63 outputs the calculated ΔX to the positional difference characteristic portion 64.

An input side of the positional difference characteristic portion 64 is connected to the ΔX calculation portion 63, and the hydraulic value filter 62, and an output side thereof is connected to the addition portion 65. The positional difference ΔX and the hydraulic value Pd' (temporally synchronized with each other) are input to the positional difference characteristic portion 64. The positional difference characteristic portion 64 calculates the power piston positional difference ΔXpp from ΔX and the hydraulic value Pd' based on, for example, the characteristic of the power piston positional difference ΔXpp like the example illustrated in FIG. 7. The characteristic of the power piston positional difference ΔXpp from the hydraulic value Pd and ΔX changes depending on the material and the dimension of the reaction disk 47 and peripheral parts, as described above. Therefore, the characteristic of the power piston positional difference ΔXpp may be set with use of a characteristic acquired from an experiment or the like in advance or with use of a characteristic analytically acquired from a characteristic value or the like. Alternatively, the electric booster 30 may be configured to calculate the power piston positional difference ΔXpp by, for example, storing, as a value of an element in a finite array, in advance the characteristic to be used and interpolating a value between elements according to the input ΔX and hydraulic value Pd. Alternatively, the electric booster 30 may calculate the power piston positional difference ΔXpp by, for example, storing the characteristic as a coefficient in a mathematical polynomial equation including ΔX and the hydraulic value Pd as variables. The positional difference characteristic portion 64 outputs the calculated power piston positional difference ΔXpp to the addition portion 65.

An input side of the addition portion 65 is connected to the positional difference characteristic portion 64 and the power piston position delay consideration filter 61, and an output side thereof is connected to the correction brake characteristic portion 66. The power piston positional difference ΔXpp and the power piston position Xpp' (temporally synchronized with each other) are input to the addition portion 65. The addition portion 65 adds the power piston positional difference ΔXpp and the power piston position Xpp', and outputs this added value to the correction brake characteristic portion 66 as a power piston position Xpp" for the correction of the characteristic.

An input side of the correction brake characteristic portion 66 is connected to the addition portion 65 and the hydraulic value filter 62, and an output side thereof is connected to the brake characteristic portion 55. The power piston position Xpp" and the hydraulic value Pd' (temporally synchronized with each other) are input to the correction brake characteristic portion 66. The correction brake characteristic portion 66 calculates a "hydraulic P–power piston position X characteristic" for the correction from the inputted power piston position Xpp" and hydraulic value Pd'. For example, the electric booster 30 may store this characteristic as a value of an element in a finite array, or may approximate, with use of the value stored as the value of the element, the characteristic to a mathematical polynomial equation including the hydraulic value Pd as a variable and store the characteristic as a coefficient thereof. Alternatively, the electric booster 30 may compare the characteristic with a characteristic acquired by multiplying a pre-stored basic "hydraulic pressure–power piston position characteristic" (a reference characteristic) by a coefficient and store a coefficient that minimizes the difference.

The correction brake characteristic portion 66 outputs the "hydraulic pressure–power piston position characteristic" for the correction that is calculated in this manner to the brake characteristic portion 55. In other words, the correction brake characteristic portion 66 causes the "hydraulic pressure–power piston position characteristic" for the correction to be stored into the memory of the ECU 51. Due to this storage, the brake characteristic used by the brake characteristic portion 55, i.e., the "hydraulic pressure P–power piston position X characteristic" used to convert the automatic brake instruction into the power piston position instruction can be corrected (updated) into the "hydraulic pressure–power piston position characteristic" for the correction. The "hydraulic pressure P–power piston position X characteristic" may be corrected (update) at any timing except for during the calculation of the "hydraulic pressure–power piston position characteristic" and when the automatic brake instruction is received, and may be corrected (updated), for example, when the brake pedal operation is ended. In the present embodiment, the automatic brake instruction can be accurately satisfied by using the "hydraulic pressure P–power piston position X characteristic" corrected in this manner when the automatic brake instruction is received.

In this manner, in the present embodiment, the ECU 51 corrects the characteristic data indicating the relationship between the hydraulic value Pd generated in the master cylinder 21 and the power piston position Xpp (the hydraulic pressure P–power piston position X characteristic) based on the input member position Xir corresponding to the operation amount of the brake pedal 6, and stores it, when the brake pedal 6 is operated (when the first braking instruction value is input). This allows the corrected characteristic data to correspond to the characteristic data in which the operation on the brake pedal 6 is taken into consideration, i.e., the relationship between the hydraulic value Pd and the power piston position Xpp when the brake pedal 6 is not operated. Then, the ECU 51 controls the electric actuator 36 (the electric motor 37) based on the corrected characteristic data when the automatic brake instruction is received (when the second braking instruction value is input). Due to this control, when generating the hydraulic pressure in the master cylinder by moving the piston based on the second braking instruction value without the brake pedal operated, the electric booster 30 can accurately generate, based on the corrected characteristic data, the braking hydraulic pressure corresponding to the braking instruction desired to be satisfied, i.e., the braking hydraulic pressure corresponding to the second braking instruction value.

In the embodiment, the ECU 51 uses the hydraulic value Pd (the detection value of the hydraulic sensor 15) input to the ECU 51 via the vehicle data bus 12, and the power piston position Xpp (the detection value of the angle sensor 39) and the input member position Xir (the detection value of the brake operation sensor 7) that are directly input to the ECU 51 without the intervention of the vehicle data bus 12, when correcting the characteristic data indicating the relationship between the hydraulic value and the power piston position based on the input member position Xir. At this time, the power piston position Xpp and the input member position Xir are temporally synchronized with the hydraulic value Pd by performing the filter processing (the delay processing) in consideration of the delay in the hydraulic value Pd (the transmission time). Therefore, the characteristic data can be accurately corrected based on the power piston position Xpp', the input member position Xir', and the hydraulic value Pd temporally synchronized with one another.

In the embodiment, the ECU 51 (the feedback portion 58 thereof) feeds back the actual power piston position Xpp (the motor rotational position) detected by the angle sensor 39 to the power piston position instruction (the motor rotational position instruction). In other words, in the embodiment, the ECU 51 (in particular, the feedback portion 58 of the ECU 51) controls the electric actuator 36 (the electric motor 37) without feeding back the hydraulic value Pd of the hydraulic sensor 15, both when the first braking instruction value is input and when the second braking instruction value is input. Therefore, the electric booster 30 can eliminate or reduce the difference between the target hydraulic pressure (the hydraulic instruction) and the actually generated braking hydraulic pressure due to the error or the delay (the transmission time) in the detection value Pd of the hydraulic sensor 15, and this effect can also contribute to the accurate generation of the desired braking hydraulic pressure.

According to the above-described embodiment, the desired braking hydraulic pressure can be accurately generated.

That is, according to the embodiment, the controller corrects the characteristic data indicating the relationship between the hydraulic value generated in the master cylinder and the movement amount of the piston, based on the operation amount of the brake pedal, and stores it, when the first braking instruction value is input. This allows the corrected characteristic data to correspond to the relationship between the hydraulic value and the movement amount of the piston in which the operation on the brake pedal is taken into consideration (for example, the relationship when the brake pedal is not operated). Then, the controller controls the electric actuator based on the corrected characteristic data, when the second braking instruction value is input. Due to this control, for example, when generating the hydraulic pressure in the master cylinder by moving the piston based on the second braking instruction value without the brake pedal operated, the electric booster 30 can accurately generate the desired braking hydraulic pressure (for example, the braking hydraulic pressure corresponding to the second braking instruction value) based on the corrected characteristic data.

Possible configurations as the electric brake apparatus based on the above-described embodiment include the following examples.

A first configuration of the electric brake apparatus includes an electric actuator configured to be activated so as to generate a braking hydraulic pressure in a master cylinder of a vehicle, an operation amount detector configured to detect an operation amount of a brake pedal of the vehicle, a piston configured to be moved due to the activation of the electric actuator, a movement amount detector configured to detect a movement amount of the piston, and a controller configured to control the electric actuator to move the piston based on a first braking instruction value based on an operation on the brake pedal or a second braking instruction value input from an inter-apparatus communication network of the vehicle. The controller is further configured to: control the electric actuator based on the first braking instruction value to move the piston to thereby generate a braking hydraulic pressure when the first braking instruction value is input; correct, based on the operation amount of the brake pedal, characteristic data indicating a relationship between the braking hydraulic value in the master cylinder input from the inter-apparatus communication network and the movement amount of the piston controlled based on the first braking instruction value, and store the corrected characteristic data while the braking hydraulic pressure is generated; and control the electric actuator based on the corrected characteristic data when the second braking instruction value is input.

As a second configuration, in the electric brake apparatus according to the first configuration, the controller is further configured to correct the characteristic data when the operation amount of the brake pedal is increasing.

As a third configuration, in the electric brake apparatus according to the first or second configuration, the controller is further configured to correct the characteristic data when the braking hydraulic value and the movement amount of the piston are increasing.

As a fourth configuration, in the electric brake apparatus according to any of the first to third configurations, the master cylinder is configured to supply the braking hydraulic pressure to a wheel cylinder that applies a braking force to the vehicle. The controller is further configured to prohibit the correction of the characteristic data when a hydraulic pressure supply apparatus provided between the master cylinder and the wheel cylinder functions and a hydraulic pressure in the wheel cylinder is increasing or reducing.

As a fifth configuration, in the electric brake apparatus according to any of the first to fourth configurations, the controller is further configured to calculate the correction of the characteristic data in consideration of a transmission time in the inter-apparatus communication network.

As a sixth configuration, the electric brake apparatus according to any of the first to fifth configurations further includes an input member connected to the brake pedal, and a reaction disk abutting against the input member and the piston and configured to distribute a reaction force of the braking hydraulic pressure generated in the master cylinder to the input member and the piston. The controller is further configured to calculate the correction of the characteristic data in consideration of a deformation amount of the reaction disk.

Having described several embodiments of the present invention, the above-described embodiments of the present invention are intended to only facilitate the understanding of the present invention, and are not intended to limit the present invention thereto. The present invention can be modified or improved without departing from the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

REFERENCE SIGN LIST 4L, 4R front wheel-side wheel cylinder (wheel cylinder)
5L, 5R rear wheel-side wheel cylinder (wheel cylinder)
6 brake pedal
7 brake operation sensor (operation amount detector)
12 vehicle data bus (inter-apparatus communication network)
15 hydraulic sensor
21 master cylinder
30 electric booster (electric brake apparatus)
32 input member
36 electric actuator
37 electric motor (electric actuator)
39 angle sensor (movement amount detector)
43 rotation-linear motion conversion mechanism (electric actuator)
45 power piston (piston)
51 electric booster ECU (controller)
55 brake characteristic portion
59 characteristic correction processing portion

The invention claimed is:

1. An electric brake apparatus comprising:
an electric actuator configured to be activated so as to generate a braking hydraulic pressure in a master cylinder of a vehicle;
an operation amount detector configured to detect an operation amount of a brake pedal of the vehicle;
a piston configured to be moved due to the activation of the electric actuator;
a movement amount detector configured to detect a movement amount of the piston; and
a controller configured to control the electric actuator to move the piston based on a first braking instruction value based on an operation on the brake pedal and a second braking instruction value input from an inter-apparatus communication network of the vehicle,
wherein the controller is configured to:
control the electric actuator based on the first braking instruction value to move the piston to thereby generate the braking hydraulic pressure when the first braking instruction value is input;
update, based on the operation amount of the brake pedal, characteristic data indicating a relationship between a braking hydraulic value in the master cylinder input from the inter-apparatus communication network and the movement amount of the piston controlled based on the first braking instruction value, and store the updated characteristic data while the braking hydraulic pressure is generated; and
control the electric actuator based on the updated characteristic data when the second braking instruction value is input.

2. The electric brake apparatus according to claim 1, wherein the controller is further configured to update the characteristic data when the operation amount of the brake pedal is increasing.

3. The electric brake apparatus according to claim 1, wherein the controller is further configured to update the characteristic data when the braking hydraulic value and the movement amount of the piston are increasing.

4. The electric brake apparatus according to claim 1, wherein the master cylinder is configured to supply the braking hydraulic pressure to a wheel cylinder that applies a braking force to the vehicle, and
wherein the controller is further configured to prohibit the update of the characteristic data when a hydraulic pressure supply apparatus provided between the master cylinder and the wheel cylinder functions and a hydraulic pressure in the wheel cylinder is increasing or decreasing.

5. The electric brake apparatus according to claim 1, wherein the controller is further configured to calculate the update of the characteristic data in consideration of a transmission time in the inter-apparatus communication network.

6. The electric brake apparatus according to claim 1, further comprising:
- an input member connected to the brake pedal; and
- a reaction disk abutting against the input member and the piston, and being configured to distribute a reaction force of the braking hydraulic pressure generated in the master cylinder to the input member and the piston,
- wherein the controller is further configured to calculate the update of the characteristic data in consideration of a deformation amount of the reaction disk.

* * * * *